(12) United States Patent
Chai

(10) Patent No.: US 12,382,258 B2
(45) Date of Patent: Aug. 5, 2025

(54) USER SERVICE PROCESSING METHOD, SYSTEM, AND RELATED DEVICE

(71) Applicant: HUAWEI TECHNOLOGIES CO., LTD., Shenzhen (CN)

(72) Inventor: Xiaoqian Chai, Dongguan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 397 days.

(21) Appl. No.: 17/959,045

(22) Filed: Oct. 3, 2022

(65) Prior Publication Data

US 2023/0045030 A1 Feb. 9, 2023

Related U.S. Application Data

(63) Continuation of application No. PCT/CN2021/083671, filed on Mar. 29, 2021.

(30) Foreign Application Priority Data

Apr. 1, 2020 (CN) .......................... 202010251898.5

(51) Int. Cl.
*H04W 4/24* (2024.01)
*H04W 8/18* (2009.01)

(52) U.S. Cl.
CPC ............... *H04W 4/24* (2013.01); *H04W 8/18* (2013.01)

(58) Field of Classification Search
CPC ...... H04W 4/24; H04W 8/18; H04L 12/1407; H04M 15/61; H04M 15/62; H04M 15/66;
(Continued)

(56) References Cited

U.S. PATENT DOCUMENTS

| 9,531,554 B1 | 12/2016 | Velusamy et al. |
| 2013/0176908 A1 | 7/2013 | Baniel et al. |
| 2015/0156334 A1* | 6/2015 | Chai ..................... H04M 15/62 |
| | | 455/406 |

FOREIGN PATENT DOCUMENTS

| CN | 101136755 A | 3/2008 |
| CN | 102957543 A | 3/2013 |

(Continued)

OTHER PUBLICATIONS

"3rd Generation Partnership Project; Technical Specification Group Services and System Aspects; Telecommunication management; Charging management; 5G system; Services, operations and procedures of charging using Service Based Interface (SBI) (Release 16)," 3GPP TS 32.290 V16.3.0, pp. 1-34, 3rd Generation Partnership Project, Valbonne, France (Dec. 2019).

(Continued)

*Primary Examiner* — Huy C Ho
(74) *Attorney, Agent, or Firm* — Leydig, Voit & Mayer, Ltd.

(57) ABSTRACT

A user service processing method in a charging system is as follows: A charging trigger device provides initial quota application mode indication information for a charging processing device, so as to indicate an initial quota request mode previously applied by the charging trigger device for a user service. The charging processing device performs charging processing on the user service based on the indication information, and delivers a charging processing result to the charging trigger device, to enable the charging trigger device to change a charging operation on the user service. In this way, by changing a cooperation relationship between the charging processing device and the charging trigger device, (Continued)

a balance between performance of the charging system and a credit control risk, or between an access delay and a credit control risk is implemented.

16 Claims, 16 Drawing Sheets

(58) Field of Classification Search
CPC .. H04M 15/785; H04M 15/83; H04M 15/852; H04M 15/853; H04M 15/854; H04M 15/88
USPC .......................................................... 455/406
See application file for complete search history.

(56) References Cited

FOREIGN PATENT DOCUMENTS

| CN | 106550162 A | 3/2017 |
|---|---|---|
| CN | 107667550 A | 2/2018 |
| WO | 2019182572 A1 | 9/2019 |

OTHER PUBLICATIONS

SA WG5, "Rel-15 CRs on Service Based Interface for 5G Charging Batch 1," 3GPP TSG-SA Meeting #86 SP-191160, Sitges, Spain, Total 2 pages, 3rd Generation Partnership Project, Valbonne, France (Dec. 10-13, 2019).

Ericsson, "Clarification of Units Usage reporting," 3GPP TSG-SA5 Meeting #127 S5-196694, Sophia-Antipolis, France, Total 10 pages, 3rd Generation Partnership Project, Valbonne, France (Oct. 14-18, 2019).

Huawei, "Discussion Paper on CHF cotrolled Quota Management", 3GPP TSG-SA5 Meeting #129e S5-201237, e-meeting, Total 4 pages, 3rd Generation Partnership Project, Valbonne, France (Feb. 25-Mar. 4, 2020).

Huawei, "Suspend or resume quota management via the charging notify request," 3GPP TSG-SA5 Meeting #129e 85-201235, e-meeting, Total 9 pages, 3rd Generation Partnership Project, Valbonne, France ( (Feb. 25-Mar. 4, 2020).

* cited by examiner

USER SERVICE PROCESSING METHOD, SYSTEM, AND RELATED DEVICE

CROSS-REFERENCE TO RELATED APPLICATIONS

This application is a continuation of International Application No. PCT/CN2021/083671, filed on Mar. 29, 2021, which claims priority to Chinese Patent Application No. 202010251898.5, filed on Apr. 1, 2020. The disclosures of the aforementioned applications are hereby incorporated by reference in their entireties.

TECHNICAL FIELD

The disclosure relates to the communications field, and in particular, to a user service processing method, a system, and a related device in a charging system.

BACKGROUND

According to the 3rd Generation Partnership Project (3GPP) standard specification, a charging trigger function (CTF) device usually applies a blocking mode initial quota request for a user service. The CTF device is to first request a quota before a user service is started, which helps reduce a credit control risk and a possibility that an operator suffers a loss. However, in this case, a performance burden on an operator charging system including the CTF device and a charging function (CHF) device is increased. In addition, an access delay of the user service is increased, and provision of delay-sensitive service is impacted, thereby further affecting user experience.

A delay-sensitive service supported by a 5th Generation (5G) network, for example, an Ultra-Reliable and Low-Latency Communication (uRLLC) service, has a relatively high requirement for an access delay. Therefore, the 3GPP standard specification defines a non-blocking mode initial quota request. The CTF device requests a quota when or after the user service is started, to reduce the access delay of the user service.

The 5G network can support an increasing quantity of user services. Some services, for example, a self-driving service, a telemedicine service, and an industrial control service, have extremely high requirements for the network, and a serious consequence may be caused if the services are terminated due to the network. This type of service is referred to as an uninterruptible service in this application. For some services such as a virtual reality (VR) service and an augmented reality (AR) service, no serious consequence is caused even if the services are terminated due to the network. This type of service is referred to as an interruptible service in this application. For the two types of services, the following problems exist if the non-blocking mode initial quota request is always applied: For the uninterruptible service, the CTF device may find a failure in requesting the quota after the user service is started; at such situation, however, the CTF device cannot arbitrarily terminate the user service but has to continue allowing the user service to pass, which causes continuous consumption by the user service on more network resources of the operator, and may cause a loss to the operator. For the interruptible service, the CTF device may also find a failure in obtaining the quota after the user service is started; at such situation, although the service can be terminated, the termination of the service affects user experience, and a malicious user may apply this mechanism to launch a denial of service (DoS) attack on the network.

Currently, when the CTF device independently determines an operation in a blocking mode/a non-blocking mode, a result of always applying the blocking mode or the non-blocking mode is caused due to lack of a large quantity of support information required for granting a quota. When the blocking mode initial quota request is always applied, the performance burden on the charging system is increased, or the access delay of the user service is increased. When the non-blocking mode initial quota request is always applied, user experience is affected, and a network security risk is even caused.

How to balance the performance burden on the charging system, the requirement for the access delay of the user service, the credit control risk, and the network security is a technical problem urgently to be resolved.

SUMMARY

In view of this, the disclosure provides a user service processing method in a charging system, to perform different processing on user services in different scenarios. The different processing includes adjusting a charging operation performed on a user service, controlling passing of a user service, and the like. In this way, a performance burden on the charging system, a requirement for an access delay of the user service, a credit control risk, and network security are balanced.

According to a first aspect, an embodiment of this application provides a charging system. The charging system includes a charging processing device (101) and a charging trigger device (102).

The charging trigger device (102) is configured to send initial quota request mode indication information to the charging processing device (101). The initial quota request mode indication information indicates that the charging trigger device (102) applies a first initial quota request mode for a user service when receiving a first start request of the user service.

The charging processing device (101) is configured to: obtain the initial quota request mode indication information, and send a charging processing result to the charging trigger device (102). The charging processing result is a result obtained by performing charging processing on the user service based on the initial quota request mode indication information.

The charging trigger device (102) is further configured to process the user service based on the charging processing result.

In the charging system, a cooperation relationship between the charging trigger device and the charging processing device is changed. The charging processing device may perform charging processing with reference to a status of an initial quota request mode applied by the charging trigger device for the user service, so that a charging processing process well fits context to obtain a more practical charging processing result. In addition, the charging trigger device may process the user service based on the charging processing result well fitting the context. In this way, the charging processing device and the charging trigger device may jointly resolve a problem caused when a CTF device independently applies an initial quota request mode.

In a possible solution, the charging trigger device (102) is further configured to: apply the first initial quota request mode for the user service when receiving the first start request, and send an initial charging request message of the user service to the charging processing device (101). The initial charging request message includes the initial quota request mode indication information. The charging processing device (101) is further configured to obtain the initial quota request mode indication information from the initial charging request message.

In a possible solution, the charging processing device (101) is further configured to send, to the charging trigger device (102), the charging processing result including either of the following items: an indication parameter indicating the charging trigger device (102) to suspend quota management for the user service, or an indication parameter indicating the charging trigger device (102) to terminate the user service.

In a possible solution, the charging processing device (101) is further configured to: if the first initial quota request mode is a non-blocking mode, and it is determined that the charging trigger device (102) is to suspend the quota management for the user service, send, to the charging trigger device (102), the charging processing result that includes the indication parameter indicating the charging trigger device (102) to suspend the quota management for the user service. The charging trigger device (102) is further configured to suspend the quota management for the user service.

In a possible solution, the charging processing device (101) is further configured to send, to the charging trigger device (102), a charging processing result that includes an indication parameter indicating the charging trigger device to apply a second initial quota request mode for the user service when receiving a second start request of the user service. The second start request is later than the first start request.

According to a second aspect, an embodiment of this application provides a user service processing method. The method is applied to a charging processing device (101). The method includes:

obtaining initial quota request mode indication information of a user service, where the initial quota request mode indication information indicates that a charging trigger device (102) applies a first initial quota request mode for the user service when receiving a first start request of the user service; and sending a charging processing result to the charging trigger device (102), where the charging processing result is a result obtained by performing charging processing on the user service based on the initial quota request mode indication information.

In a possible solution, the charging processing device (101) obtains the initial quota request mode indication information based on an initial charging request message.

In a possible solution, the charging processing device (101) obtains the initial quota request mode indication information based on an interim charging request message.

In a possible solution, the charging processing device (101) obtains the initial quota request mode indication information based on a charging policy sent by a policy control device. The charging policy includes an initial quota request mode for the user service.

In a possible solution, the charging processing device (101) sends, by using an initial charging response message of the user service, a charging processing result including either of the following items:

an indication parameter indicating the charging trigger device (102) to suspend quota management for the user service; or an indication parameter indicating the charging trigger device (102) to terminate the user service.

In a possible solution, the charging processing device (101) sends, by using an interim charging response message of the user service or a notification message, a charging processing result including any one of the following items:

an indication parameter indicating the charging trigger device (102) to suspend quota management for the user service;

an indication parameter indicating the charging trigger device (102) to resume quota management for the user service; or an indication parameter indicating the charging trigger device (102) to terminate the user service.

In a possible solution, if the first initial quota request mode is a non-blocking mode, the charging processing result includes the indication parameter indicating the charging trigger device (102) to suspend the quota management for the user service. In this case, performing charging processing on the user service based on the initial quota request mode indication information includes: failing in granting a quota for the user service, and determining, based on the initial quota request mode indication information, that the charging trigger device (102) is to suspend the quota management for the user service.

In a possible solution, if the first initial quota request mode is a non-blocking mode, and it is determined that the charging trigger device (102) is to change (from applying online charging mode) to apply an offline charging mode for the user service, a charging processing result that includes an indication parameter indicating the charging trigger device (102) to change to apply the offline charging mode for the user service is sent to the charging trigger device (102).

In a possible solution, if the first initial quota request mode is a non-blocking mode, and it is determined that the charging trigger device (102) is to apply unlimited quota management for the user service, a charging processing result that includes an indication parameter indicating the charging trigger device (102) to apply unlimited quota management for the user service is sent to the charging trigger device (102).

In a possible solution, if the first initial quota request mode is a non-blocking mode, and it is determined that the charging trigger device (102) is to change to apply a blocking mode initial quota request for the user service, a charging processing result that includes an indication parameter indicating the charging trigger device (102) to apply the blocking mode initial quota request for the user service is sent to the charging trigger device (102).

In a possible solution, if the first initial quota request mode is a non-blocking mode, and it is determined that the charging trigger device (102) is to change to apply a blocking mode initial quota request for the user service and that the charging trigger device (102) suspends the quota management for the user service, a charging processing result that includes the following content is sent to the charging trigger device (102):

an indication parameter indicating the charging trigger device (102) to apply the blocking mode initial quota request for the user service; or an indication parameter indicating the charging trigger device (102) to resume the quota management for the user service.

In a possible solution, the charging processing device (101) adds a granted quota to an interim charging response message corresponding to an interim charging request message that does not include quota request information, to indicate the charging trigger device (102) to resume the quota management for the user service.

In a possible solution, if the first initial quota request mode is a non-blocking mode, the charging processing result includes the indication parameter indicating the charging trigger device (102) to terminate the user service. In this case, performing charging processing on the user service based on the initial quota request mode indication information includes: failing in granting a quota for the user service, and determining, based on the initial quota request mode indication information, that the charging trigger device (102) is to terminate the user service.

In a possible solution, the method further includes: receiving a non-quota usage amount of the user service from the charging trigger device (102).

In a possible solution, if the first initial quota request mode is a blocking mode, and it is determined that the charging trigger device (102) is to change to apply a non-blocking mode initial quota request for the user service, a charging processing result that includes an indication parameter indicating the charging trigger device (102) to apply the non-blocking mode initial quota request for the user service is sent to the charging trigger device (102).

In a possible solution, if the first initial quota request mode is a blocking mode, and it is determined that the charging trigger device (102) is to change to apply a non-blocking mode initial quota request for the user service and that the charging trigger device (102) does not suspend or normally performs the quota management for the user service, a charging processing result that includes the following content is sent to the charging trigger device (102):

an indication parameter indicating the charging trigger device (102) to apply the non-blocking mode initial quota request for the user service; or an indication parameter indicating the charging trigger device (102) to suspend the quota management for the user service.

In a possible solution, the charging processing result further includes an indication parameter indicating the charging trigger device to apply a second initial quota request mode for the user service when receiving a second start request of the user service. The second start request is later than the first start request.

In a possible solution, the first initial quota request mode is the non-blocking mode, and the second initial quota request mode is the blocking mode; or the first initial quota request mode is the blocking mode, and the second initial quota request mode is the non-blocking mode.

In a possible solution, performing charging processing on the user service based on the initial quota request mode indication information is triggered by the initial charging request message of the user service. The charging processing result is sent to the charging trigger device (102) by using a corresponding initial charging response message.

In a possible solution, performing charging processing on the user service based on the initial quota request mode indication information is triggered by the interim charging request message of the user service. The charging processing result is sent to the charging trigger device (102) by using the corresponding interim charging response message.

In a possible solution, performing charging processing on the user service based on the initial quota request mode indication information is triggered by another charging request message or an account management message. The another charging request message is a charging request message of another user service. The another user service corresponds to an identical account as the user service. The account management message is a management message of the account corresponding to the user service. The charging processing result is sent to the charging trigger device (101) by using a notification message.

In a possible solution, the charging processing device (101) further records or stores the initial quota request mode for the user service based on the initial quota request mode indication information.

According to a third aspect, an embodiment of this application provides a user service processing method. The method is applied to a charging trigger device (102). The method includes:

sending initial quota request mode indication information of a user service to a charging processing device (101), where the initial quota request mode indication information indicates that the charging trigger device (102) applies a first initial quota request mode for the user service when receiving a first start request of the user service;

receiving a charging processing result of the user service from the charging processing device (101); and processing the user service based on the charging processing result.

In a possible solution, the sending initial quota request mode indication information of a user service to a charging processing device (101) is as follows:

when the first start request is received, applying the first initial quota request mode for the user service; and sending the initial quota request mode indication information to the charging processing device (101) by using an initial charging request message.

In a possible solution, the charging trigger device (102) further sends the initial quota request mode indication information to the charging processing device (101) by using an interim charging request message.

In a possible solution, the charging processing result includes any one of the following items:

an indication parameter indicating the charging trigger device (102) to suspend quota management for the user service;

an indication parameter indicating the charging trigger device (102) to resume quota management for the user service; or an indication parameter indicating the charging trigger device (102) to terminate the user service.

In a possible solution, the charging processing result includes the indication parameter indicating the charging trigger device (102) to suspend the quota management for the user service. The processing the user service based on the charging processing result includes:

suspending the quota management for the user service.

In a possible solution, the charging processing result includes the indication parameter indicating the charging trigger device (102) to resume the quota management for the user service. The processing the user service based on the charging processing result includes:

resuming the quota management for the user service.

In a possible solution, after sending an interim charging request message that does not include quota request information, the charging trigger device (102) receives the charging processing result from the charging processing device (101) based on a response message corresponding to the interim charging request message. The charging processing result includes a quota granted by the charging processing device (101) for the user service. The processing the user service based on the charging processing result includes:

resuming the quota management for the user service.

In a possible solution, the charging processing result includes the indication parameter indicating the charging trigger device (102) to terminate the user service. The processing the user service based on the charging processing result includes:

terminating the user service, and sending a non-quota usage amount of the user service to the charging processing device (101).

In a possible solution, the charging processing result further includes an indication parameter indicating the charging trigger device to apply a second initial quota request mode for the user service when receiving a second start request of the user service. The second start request is later than the first start request. The processing the user service based on the charging processing result further includes:

updating an initial quota request mode for the user service to the second initial quota request mode.

In a possible solution, the charging trigger device (102) receives the charging processing result by using an initial charging response message of the user service; receives the charging processing result by using an interim charging response message of the user service; or receives the charging processing result by using a notification message.

In a possible solution, the processing the user service based on the charging processing result includes:

updating an initial quota request mode for the user service to the second initial quota request mode based on the charging processing result.

In a possible solution, the charging trigger device (102) updates the initial quota request mode for the user service to the second initial quota request mode based on the indication parameter that is in the charging processing result and that indicates the charging trigger device (102) to change the initial quota request mode corresponding to the user service to the second initial quota request mode.

In a possible solution, the charging trigger device (102) updates the initial quota request mode for the user service to the second initial quota request mode based on information related to a granted quota in the charging processing result.

In a possible solution, the updating an initial quota request mode for the user service to the second initial quota request mode includes:

sending, to a policy control device (104), indication information for disabling the first initial quota request mode to be applied for the user service; or sending, to a policy control device (104), indication information for changing the initial quota request mode corresponding to the user service to the second initial quota request mode.

In a possible solution, the first initial quota request mode is a non-blocking mode, and the second initial quota request mode is a blocking mode; or the first initial quota request mode is a blocking mode, and the second initial quota request mode is a non-blocking mode.

According to a fourth aspect, an embodiment of this application provides a charging processing device (101), including an obtaining module (701) and a sending module (702).

The obtaining module (701) is configured to obtain initial quota request mode indication information of a user service. The initial quota request mode indication information indicates that a charging trigger device (102) applies a first initial quota request mode for the user service when receiving a first start request of the user service.

The sending module (702) is configured to send a charging processing result to the charging trigger device (102). The charging processing result is a result obtained by performing charging processing on the user service based on the initial quota request mode indication information.

In a possible solution, the obtaining module (701) is further configured to:

receive an initial charging request message of the user service from the charging trigger device (102), where the initial charging request message includes the initial quota request mode indication information; and obtain the initial quota request mode indication information from the initial charging request message.

In a possible solution, the sending module is further configured to:

generate either of the following items based on the initial quota request mode indication information, and add either of the following items to the charging processing result:

an indication parameter indicating the charging trigger device (102) to suspend quota management for the user service; or an indication parameter indicating the charging trigger device (102) to terminate the user service.

In a possible solution, the sending module is further configured to:

generate, based on the initial quota request mode indication information, an indication parameter indicating the charging trigger device to apply a second initial quota request mode for the user service when receiving a second start request of the user service; and add the indication parameter to the charging processing result, where the second start request is later than the first start request.

According to a fifth aspect, an embodiment of this application provides a charging trigger device (102), including a sending module (801), a receiving module (802), and a processing module (803).

The sending module (801) is configured to send initial quota request mode indication information of a user service to a charging processing device (101). The initial quota request mode indication information indicates that the charging trigger device (102) applies a first initial quota request mode for the user service when receiving a first start request of the user service.

The receiving module (802) is configured to receive a charging processing result of the user service from the charging processing device (101).

The processing module (803) is configured to process the user service based on the charging processing result.

In a possible solution, the sending module is further configured to:

when the first start request is received, apply the first initial quota request mode for the user service; and send an initial charging request message of the user service to the charging processing device (101), where the initial charging request message includes the initial quota request mode indication information.

In a possible solution, the receiving module (802) is further configured to receive, from the charging processing device (101), the charging processing result that includes an indication parameter indicating the charging trigger device (102) to suspend quota management for the user service, and the processing module (803) is further configured to suspend the quota management for the user service. Alternatively, the receiving module (802) is further configured to receive, from the charging processing device (101), the charging processing result that includes an indication parameter indicating the charging trigger device (102) to terminate the user service, and the processing module (803) is further configured to terminate the user service.

In a possible solution, the receiving module (802) is further configured to receive, from the charging processing device (101), a charging processing result that includes an indication parameter indicating the charging trigger device to apply a second initial quota request mode for the user service when receiving a second start request of the user service. The second start request is later than the first start request. The processing module (803) is further configured to update an initial quota request mode for the user service to the second initial quota request mode.

According to a sixth aspect, an embodiment of this application provides a charging processing device (101), including a processor and a memory.

The memory is configured to store program instructions.

The processor is configured to invoke and execute the program instructions stored in the memory, to enable the charging processing device (101) to perform the user service processing method according to the second aspect or any possible solution in the second aspect.

According to a seventh aspect, an embodiment of this application provides a computer readable storage medium, including instructions. When the instructions are run on a computer, the computer is enabled to perform the user service processing method according to the second aspect or any possible solution of the second aspect.

According to an eighth aspect, an embodiment of this application provides a charging trigger device (102), including a processor and a memory.

The memory is configured to store program instructions.

The processor is configured to invoke and execute the program instructions stored in the memory, to enable the charging trigger device (102) to perform the user service processing method according to the third aspect or any possible solution in the third aspect.

According to a ninth aspect, an embodiment of this application provides a computer readable storage medium, including instructions. When the instructions are run on a computer, the computer is enabled to perform the user service processing method according to the third aspect or any possible solution of the third aspect.

According to a tenth aspect, an embodiment of this application provides a user service processing method. The method is applied to a policy control device (104). The method includes:

sending initial quota request mode indication information of a user service to a charging trigger device (102), where the initial quota request mode indication information indicates that the charging trigger device (102) applies a first initial quota request mode for the user service when receiving a first start request of the user service;

receiving the initial quota request mode indication information of the user service from the charging trigger device (102), where the indication information is indication information for disabling the first initial quota request mode to be applied for the user service, or indication information for indicating to change an initial quota request mode corresponding to the user service to a second initial quota request mode; and updating the initial quota request mode for the user service to the second initial quota request mode based on the initial quota request mode indication information.

According to an eleventh aspect, an embodiment of this application provides a chip. When the chip is run, the chip is configured to implement the method in the second aspect, the third aspect, any possible implementation solution of the second aspect, or any possible implementation solution of the third aspect.

BRIEF DESCRIPTION OF DRAWINGS

FIG. 3A-1 and FIG. 3A-2 are a first flowchart of a user service processing method performed by a charging processing device based on an initial charging response message according to an embodiment of this application;

FIG. 3B-1 and FIG. 3B-2 are a first flowchart of a user service processing method performed by a charging processing device based on an interim charging response message according to an embodiment of this application;

FIG. 4A-1 and FIG. 4A-2 are a first flowchart of a user service processing method performed by a charging processing device based on a notification message according to an embodiment of this application;

FIG. 5A-1 and FIG. 5A-2 are a first flowchart of a user service processing method performed by a charging trigger device based on a charging processing result according to an embodiment of this application;

FIG. 5B-1 and FIG. 5B-2 are a second flowchart of a user service processing method performed by a charging trigger device based on a quota granting result according to an embodiment of this application;

DESCRIPTION OF EMBODIMENTS

The following describes technical solutions in embodiments of this application with reference to the accompanying drawings in embodiments of this application. In descriptions of this application, unless otherwise specified, "I" represents an "or" relationship between associated objects. For example, A/B may represent A or B. In this application, "and/or" describes only an association relationship for describing associated objects and represents that three relationships may exist. For example, A and/or B may represent the following three cases: Only A exists, both A and B exist, and only B exists. Herein, A or B may be singular or plural. In addition, in the descriptions of this application, unless otherwise specified, "a plurality of" means two or more than two. "At least one of the following items (pieces)" or a similar expression thereof indicates any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe the technical solutions in embodiments of this application, words such as "first" and "second" are used in embodiments of this application to distinguish between same items or similar items that have basically the same functions or purposes. A person skilled in the art may understand that the terms such as "first" and "second" do not limit a quantity or an execution sequence, and the terms such as "first" and "second" do not indicate a definite difference.

Figure 1:
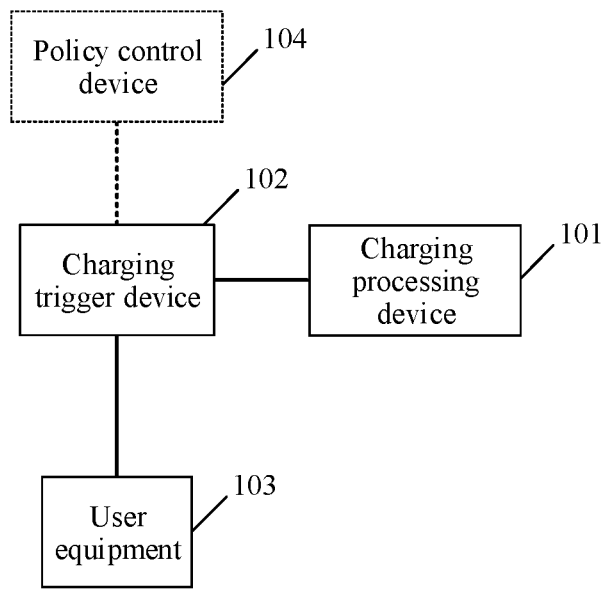
FIG. 1 is a diagram of architecture of a charging system according to an embodiment of this application.

FIG. 1 is a diagram of architecture of a charging system according to an embodiment of this application. The charging system is configured to control a charging trigger device to process a user service. The charging system includes a charging processing device 101, a charging trigger device 102, and user equipment 103. Optionally, the charging system may further include a policy control device 104. Main functions of these devices are separately described as follows.

The charging processing device 101 is connected to a charging trigger device (including the charging trigger device 102 and another charging trigger device not shown in FIG. 1), and is configured to: receive quota request information, usage amount information, and the like reported by the charging trigger device, and perform charging processing on a user service based on such information. In addition, the charging processing device 101 is further configured to: perform charging processing based on an initial quota request mode that is of the user service and that is reported by the charging trigger device and based on information related to the user service, for example, a user type, customer information, an account balance, a service whitelist, a service blacklist, a change trend of an account balance, and a remaining validity period of a tariff plan; and send a charging processing result to the charging trigger device, so that the charging trigger device adjusts a charging operation performed on the user service.

The charging processing device 101 may be a charging function (CHF) device defined in the 3GPP standard specification, or may be a converged charging system (CCS) device defined in the 3GPP standard specification. Herein, the CCS device has a function of the CHF device.

It can be understood that in actual application, the charging system shown in FIG. 1 may have more charging processing devices. For example, a cluster may be constructed. The cluster includes a plurality of charging processing devices that are backups for one other, thereby improving a redundancy capability and implementing high availability.

For ease of description, in embodiments of this application, the charging processing device is sometimes directly referred to as a CHF device.

The charging trigger device 102 is connected to the charging processing device 101, the policy control device 104 (if exists), and the user equipment 103. The device may be configured to perform the following actions.

(1) Receive a start request of the user service (that is, a request message used to request the charging trigger device to start the user service) from the user equipment 103, start the user service according to the start request, and perform a charging operation such as quota management and usage amount reporting on the user service.

(2) Report, to the charging processing device 101, an initial quota request mode applied by the charging processing device 101 for the user service, and receive a charging processing result from the charging processing device 101, to adjust a charging operation on the user service based on the charging processing result, where the adjustment includes adjusting the initial quota request mode applied for the user service and/or adjusting an interim charging operation on the user service (for example, suspending quota management for the user service and terminating the user service).

(3) Determine, based on the charging processing result (for example, a quota granting result) returned by the charging processing device 101 for the user service, the initial quota request mode applied by the charging processing device 101 for the user service.

(4) Store the initial quota request mode for the user service locally in the charging trigger device 102 or in an external storage entity. Alternatively, if there is the policy control device 104, report, to the policy control device 104, information related to the initial quota request mode determined by the charging trigger device 102 or the charging processing device 101. In this way, the initial quota request mode for the user service can be shared between a plurality of charging trigger devices, to reduce synchronization and interaction between different charging trigger devices and reduce a storage burden on the charging trigger device 102.

The charging trigger device 102 may be a CTF device defined in the 3GPP standard specification. When the user service is a 5G data connection service, a function of the charging trigger device 102 may be set in an SMF (Session Management Function, session management function) device defined in the 3GPP specification. When the user service is a voice service, a function of the charging trigger device 102 may be set in an application server (AS) or a call session control function (CSCF) device in an IP multimedia sub-system (IMS). Embodiments of this application do not limit a physical device in which the function of the charging trigger device 102 is set.

It can be understood that in actual application, the charging system shown in FIG. 1 may have more charging trigger devices. The charging trigger devices may be connected to the same charging processing device (for example, the charging processing device 101), or may be connected to different charging processing devices. A plurality of service start requests initiated by the same user equipment for the same user service may be processed by the same charging trigger device or different charging trigger devices.

For ease of description, in embodiments of this application, the charging trigger device is sometimes also referred to as a CTF device.

The user equipment 103 is connected to the charging trigger device (the charging trigger device 102 or another charging trigger device not shown in FIG. 1); and is configured to: send a start request of the user service to the charging trigger device, and access or apply the user service by using the charging trigger device.

The user equipment 103 may be user equipment (UE) defined in the 3GPP standard specification, and may be a wireless access device with a wireless communication function or a wired access device without a wireless communication function. The user equipment 103 includes a handheld device, a vehicle-mounted device, a wearable device, or a computing device. For example, the user equipment 103 may be a mobile phone, a tablet computer, or a computer with a wireless transmission/reception function. The user equipment 103 may further be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city, a wireless terminal in a smart home, or the like.

It can be understood that in actual application, the charging system shown in FIG. 1 may have more user equipment.

The policy control device 104 is connected to the charging trigger device (the charging trigger device 102 or another charging trigger device not shown in FIG. 1); and is configured to: provide a charging policy of a user service for the charging trigger device, and provide an initial quota request mode corresponding to the user service for the charging trigger device.

The policy control device 104 may be a policy control function (PCF) device defined in the 3GPP standard specification, or a policy and charging rules function (PCRF) device.

For ease of description, in embodiments of this application, the policy control device is sometimes directly referred to as a PCF device.

It can be noted that the "connect" or "connected" described above includes a direct connection or a connection by using one or more intermediate network devices.

In the architecture of the charging system shown in FIG. 1, a cooperation relationship between the charging processing device and the charging trigger device may be changed, so that the charging operation performed by the charging trigger device on the user service can be dynamically adjusted as required. In this way, a non-blocking mode initial quota request can be applied when a credit control risk of the user service is relatively low, and a blocking mode initial quota request can be applied when the credit control risk of the user service is relatively high. Proper processing is performed on use of the user service in the non-blocking mode, for example, suspending the quota management for the user service or terminating the user service, to consider both a requirement of the user service for an access delay and a requirement of an operator for system performance and credit risk control.

For ease of understanding of embodiments of this application, the following explains some concepts.

The user service indicates a service accessed or used, via the charging trigger device (the charging trigger device 102 or the charging trigger device not shown in FIG. 1), by the user equipment 103, and includes but is not limited to the following services.

(1) A data connection service, for example, one or more data flows corresponding to a rating group (RG) in a protocol data unit (PDU) session or data flows corresponding to an RG and a service identifier in a PDU session, may be understood as the user service in embodiments of this application. In embodiments of this application, "a user service in a PDU session" or "a service in a PDU session" indicates a plurality of data flows corresponding to an RG in a PDU session, or may be a data flow corresponding to a service identifier in a plurality of data flows corresponding to an RG.

(2) IMS service (3) Capability exposure service, and the like.

For ease of description, in embodiments of this application, the user service is sometimes briefly referred to as a "service".

For the user service accessed or used by the user equipment 103, a data connection service in the 5G network is mainly used as an example for description in embodiments of this application. Correspondingly, for charging data, information related to data traffic is mainly used as an example for description in embodiments of this application. The information related to data traffic includes but is not limited to information that is about a PDU session and that is collected by the charging trigger device, a service unit amount allowed to pass in a PDU session, a charging trigger condition, a time stamp, and the like.

Starting a user service indicates that after receiving a start request of the user service, the charging trigger device allows the user service to pass, which includes allowing signaling or data of the user service to pass. For example, when the user service is the foregoing data connection service, "starting a user service" includes continuing an establishment or update operation on a PDU session for the data connection service (if the PDU session is unavailable) or allowing a service data flow to pass (if the PDU session is available).

Terminating a user service indicates that the charging trigger device (the charging trigger device 102 or the charging trigger device not shown in FIG. 1) stops allowing the user service to pass. For example, when the user service is the foregoing data connection service, "terminating a user service" includes a termination operation on a data flow corresponding to the user service.

An initial quota request mode (IqrMod) indicates a mode in which the charging trigger device (the charging trigger device 102 or the charging trigger device not shown in FIG. 1) requests a quota for the user service for a first time after receiving the start request of the user service, which mainly reflects a time sequence between requesting the quota for the user service for the first time and starting the user service after receiving the start request of the user service. The initial quota request mode can be classified into the blocking mode and the non-blocking mode depending on whether a process of the first time of requesting a quota blocks the operation of starting the user service. Therefore, the initial quota request is classified into "a blocking mode initial quota request" and "a non-blocking mode initial quota request" that are respectively described as follows.

The blocking mode initial quota request (BIqr) indicates that the charging trigger device (the charging trigger device 102 or the charging trigger device not shown in FIG. 1) responds to the start request that is of the user service and that is received from the user equipment 103, requests a quota for the user service from the charging processing device 101, and starts the user service only after the quota granted by the charging processing device to the user service is received.

The non-blocking mode initial quota request (NBIqr) indicates that the charging trigger device (the charging trigger device 102 or the charging trigger device not shown in FIG. 1) responds to the start request that is of the user service and that is received from the user equipment 103; and preferably starts the user service rather than requesting a quota for the user service from the charging processing device 101, or starts the user service and requests a quota for the user service from the charging processing device 101 at the same time. In other words, an operation of starting the user service does not depend on the quota granted by the charging processing device 101 to the user service. Although when receiving the quota granted by the charging processing device 101 to the user service, the charging trigger device has allowed the user service to pass, in most scenarios, especially when a user account corresponding to the user service has a sufficient balance, the charging trigger device may receive the quota granted by the charging processing device 101. Therefore, a service usage amount that is allowed to pass may be deducted from the granted quota, and the service usage amount that is allowed to pass may be reported to the charging processing device 101 by using a service usage amount, e.g. a used service unit (USU), in a subsequent charging request message. However, this mechanism has limited reliability because account information corresponding to the user service dynamically changes. When the balance in the account is lower than a threshold or a tariff plan corresponding to the account changes, a serious credit control risk may occur if the non-blocking mode initial quota request is always applied.

It can be learned from this that, after the charging trigger device receives, from the charging processing device 101, indication information of a specific mode initial quota request that the charging processing device 101 determines to apply, if the corresponding user service is started, the charging trigger device applies the specific mode initial quota request for the user service only after receiving a next start request of the user service, instead of immediately applying the specific mode initial quota request.

Initial quota request mode indication (IqrModInd) information indicates indication information for indicating a specific initial quota request mode (that is, one of the foregoing two modes) that is applied to the user service when the charging trigger device (the charging trigger device 102 or the charging trigger device not shown in FIG. 1) receives the start request of the user service. The initial quota request mode indication information may include only a value of IqrMod, may include an IqrMod field and a value of the IqrMod field, or may include a user service identifier (SID) field and a value of the SID field. A data structure of the initial quota request mode indication information is not limited in embodiments of this application.

A required condition of an initial quota request mode indicates a condition that attribute information of the user service, the account corresponding to the user service, and the like are to meet to enable the charging trigger device to apply the initial quota request mode for the user service. For example, a required condition for the non-blocking mode may be that "the user service is a delay-sensitive service that has been subscribed continuously for more than 12 months, and the account balance exceeds 1000 yuan"; and a required condition for the blocking mode may be that "the user service is not a delay-sensitive service, and the account balance is less than 100 yuan". It can be understood that the required condition of the initial quota request mode is not limited to the requirement on the attribute information of the user service and the account corresponding to the user service, and may be preconfigured by an operator or determined jointly by the operator and the user. This is not limited in embodiments of this application.

It can be noted that for convenience of description, in embodiments of this application, "applying an initial quota request mode for a user service" is sometimes described as "applying a specific mode initial quota request for a user service".

The following further describes an example of a method procedure that can be implemented based on the architecture of the charging system shown in FIG. 1. As shown in FIG. 2, FIG. 3A-1 and FIG. 3A-2 to FIG. 3D, FIG. 4A-1 and FIG. 4A-2 and FIG. 4B, and FIG. 5A-1 and FIG. 5A-2 and FIG. 5B-1 and FIG. 5B-2, in the method procedure corresponding to each diagram, the charging trigger device corresponds to the charging trigger device 102 in FIG. 1, and the charging processing device corresponds to the charging processing device 101 in FIG. 1, the user equipment corresponds to the user equipment 103 in FIG. 1, and the policy control device (if exists) corresponds to the policy control device 104 in FIG. 1. This is not repeatedly described in the following descriptions of the method procedures.

Figure 2:
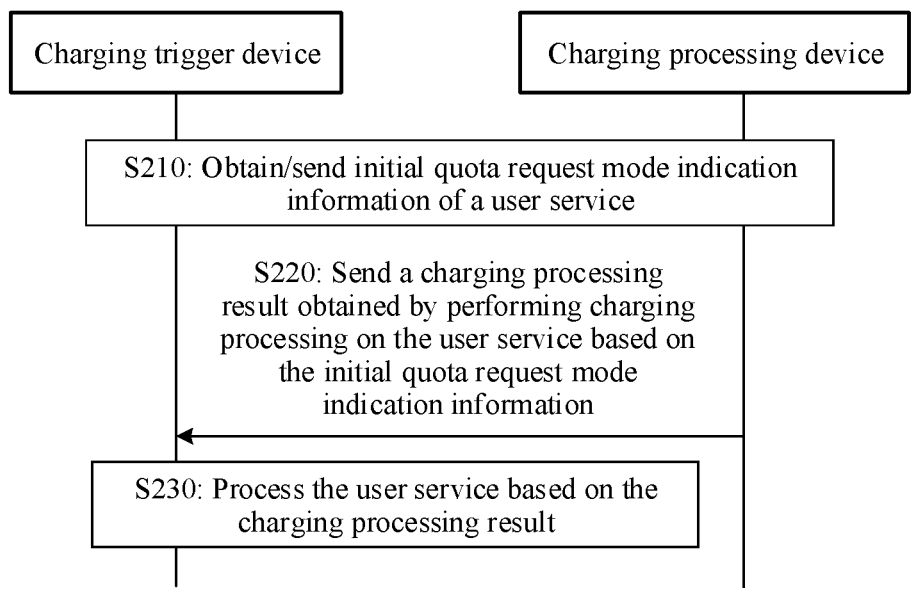
FIG. 2 is a flowchart of a user service processing method according to an embodiment of this application.

In a method procedure corresponding to FIG. 2, the charging trigger device changes a charging operation on a user service based on a charging processing result sent by the charging processing device. The method procedure mainly includes the following steps.

Step 210: The charging trigger device sends initial quota request mode indication information of a user service to the charging processing device, or the charging processing device obtains initial quota request mode indication information.

Specifically, the step may be that the charging trigger device sends the initial quota request mode indication information to the charging processing device, or may be that the charging processing device obtains the initial quota request mode indication information. The latter process includes the following step.

The charging processing device directly reads the initial quota request mode indication information from a local storage device, or reads an initial quota request mode for the user service from a local storage device, to indirectly obtain the initial quota request mode indication information.

Alternatively, the charging processing device determines the initial quota request mode indication information based on configuration information of the user service.

Alternatively, the charging processing device receives the initial quota request mode indication information from the charging trigger device.

The charging trigger device may send the initial quota request mode indication information to the charging processing device by using an initial charging request message or by using an interim charging request message.

In this embodiment of this application, the initial charging request message indicates a first charging request message that is sent by the charging trigger device to the charging processing device after receiving a start request of the user service. The initial charging request message is mainly used to request a quota. For ease of description, in this embodiment of this application, the initial charging request message of the user service is sometimes briefly referred to as an initial charging request.

In this embodiment of this application, the interim charging request message indicates a subsequent charging request message that is of the user service and that is sent by the charging trigger device after sending the initial charging request message of the user service to the charging processing device. The interim charging request message may be used to request a quota, may be used to report a usage amount, or may be used to both request a quota and report a usage amount. For ease of description, in this embodiment of this application, the interim charging request message of the user service is sometimes also briefly referred to as an interim charging request.

Step 220: The charging processing device sends, to the charging trigger device, a charging processing result obtained by performing charging processing on the user service based on the initial quota request mode indication information.

Specifically, the charging processing device performs charging processing on the user service based on the initial quota request mode indication information, and sends, to the charging trigger device, the charging processing result obtained by performing the charging processing. Based on the initial quota request mode indication information, the charging processing device may learn whether the current user service is started, and a specific initial quota request mode that is applied by the charging trigger device for the user service. Therefore, in the charging processing process, charging processing may be further performed with reference to some attribute information of the user service, for example, a type of the user service (for example, interruptibility), thereby generating the corresponding charging processing result. The charging processing result includes a quota granting result, an indication parameter related to the initial quota request mode for the user service, and the like, so that the charging trigger device accordingly adjusts a charging operation on the user service. The quota granting result may be information about the granted quota, for example, a value of the granted quota and a failure reason for granting a quota.

For example, when the initial quota request mode indication information indicates that the charging trigger device previously applies a non-blocking mode initial quota request (a first initial quota request mode) for the user service, if it is determined that the initial quota request mode for the user service is to be changed to a blocking mode or the non-blocking mode initial quota request of the user service is to be disabled, the charging processing result includes an indication parameter for "indicating the charging trigger device to apply a second initial quota request mode ("the blocking mode" herein) for the user service when receiving a next start request of the user service". Specifically, the indication parameter may be an indication parameter for indicating to disable the non-blocking mode initial quota request, or may be an indication parameter for indicating to change the initial quota request mode to the blocking mode, so that the charging trigger device applies a blocking mode initial quota request when receiving the next start quest of the user service, to avoid a remote credit control risk and a network security risk (to prevent a DoS attack). In addition, when determining a quota granting failure, the charging processing device may further determine that the user service is to be terminated (if it is determined that the user service is interruptible and it is determined that the user service is an interruptible service). A charging operation control command of "terminating a service" is added to the charging processing result. If it is determined that the quota management for the user service is to be suspended (if the user service is an uninterruptible service), the charging processing result further includes a charging operation control command of "suspending the quota management". Suspending the quota management may be changing to apply an offline charging mode for the user service or changing to apply an unlimited quota (that is, the charging trigger device does not trigger a quota request because a quota is used up). Although real-time credit control cannot be performed on the user service after the quota management is suspended, charging information of the user service may still be collected as a basis for subsequent charging processing. Charging processing in the quota granting failure is performed based on the initial quota request mode indication information, so that proper processing measures can be performed for the user service, to avoid a credit control risk and a network security risk.

For another example, when the initial quota request mode indication information indicates that the charging trigger device previously applies the blocking mode initial quota request (the first initial quota request mode) for the user service, if it is determined that the initial quota request mode for the user service is to be changed to the non-blocking mode or the non-blocking mode quota management for the user service is to be resumed (for example, when the quota is successfully granted, the charging processing device may further analyze account information of the user service if an account balance of the user service is sufficient), the charging processing result may include an indication parameter for "indicating the charging trigger device to apply the second initial quota request mode (herein, the non-blocking mode) for the user service when receiving the next start request for the user service. Specifically, the indication parameter may be an indication parameter for indicating to change the initial quota request mode to the non-blocking mode. Alternatively, if the initial quota request mode for the user service is configured as the non-blocking mode by default, and the charging processing device previously disables the non-blocking mode, the indication parameter may be an indication parameter for resuming the non-blocking initial quota request mode that is of the user service and that is configured by default, so that the charging trigger device can apply the non-blocking mode initial quota request for the user service when receiving the next start request of the user service, to reduce an access delay of the user service. In this case, the charging processing device may further add, to the charging processing result, an indication parameter for "suspending the quota management" (which means that quota management or limitation is not performed on the user service before the user service is ended, unless the indication parameter for "resuming the quota management" that is sent by the charging processing device is received again), to reduce complex credit control and improve system efficiency in a service application process in this time.

The charging processing device may alternatively not add an explicit indication parameter in the charging processing result. Instead, for example, amounts of granted quotas are changed, so that quotas granted for a plurality of times present an upward trend or a downward trend. In this way, the charging trigger device adjusts, in an "implicit" manner, the initial quota request mode applied for the user service.

For more examples, refer to subsequent embodiments of this application.

Step 230: The charging trigger device processes the user service based on the charging processing result.

Specifically, the charging trigger device receives the charging processing result from the charging processing device, and then processes the user service based on the charging processing result.

Specifically, if the charging processing result includes the indication parameter for "terminating the user service", the charging trigger device terminates the user service. Optionally, the charging trigger device reports a non-quota usage amount previously recorded to the charging processing device. If the charging processing result includes the indication parameter for "suspending the quota management", the charging trigger device suspends the quota management for the user service. For example, the charging trigger device may change to apply the offline charging mode for the user service or to apply unlimited quota management (that is, the charging trigger device does not trigger a quota request because the quota is used up). If the charging processing result includes the indication parameter for "indicating the charging trigger device to apply the second initial quota request mode for the user service when receiving the next start request of the user service", the charging trigger device changes the initial quota request mode for the user service. If the charging processing result does not include the indication parameter for "indicating the charging trigger device to apply the second initial quota request mode for the user service when receiving the next start request of the user service", the charging trigger device may further determine, based on a quota granting result included in the charging processing result (for example, a quota granting failure reason, or a quantity of granted quotas much less than a requested amount), whether to change the initial quota request mode for the user service.

Specifically, the charging trigger device may further determine, based on quota granting information included in a plurality of charging processing results, whether to change the initial quota request mode for the user service. For example, when it is learned that the previous plurality of quota granting times are all successful, and the current initial quota request mode is the blocking mode, the charging trigger device may determine to change to apply the non-blocking mode initial quota request for the user service when receiving the next start request of the user service. For another example, if the quotas granted for a plurality of times present the downward trend, and the current initial quota request mode is the non-blocking mode, the charging trigger device may determine to change to apply the blocking mode initial quota request for the user service when the next start request of the user service is received.

For more examples, refer to subsequent embodiments of this application.

The foregoing method procedure corresponding to FIG. 2 enables the charging processing device to perform charging processing on the user service based on the initial quota request mode applied by the charging trigger device for the user service, and deliver the corresponding charging processing result, so that the charging trigger device can process the user service (mainly change a charging operation on the user service), to facilitate a dynamical balance between a requirement of a terminal user for an access delay and a requirement of an operator for system performance and credit risk control in real time.

For the foregoing method procedure corresponding to FIG. 2, further refer to the method procedures corresponding to FIG. 3A-1 and FIG. 3A-2 to FIG. 3D, FIG. 4A-1 and FIG. 4A-2 and FIG. 4B, and FIG. 5A-1 and FIG. 5A-2 and FIG. 5B-1 and FIG. 5B-2 provided in embodiments of this application.

FIG. 3A-1 and FIG. 3A-2 to FIG. 3D are flowcharts of a method in which a charging processing device processes a user service based on a charging response message according to an embodiment of this application. The following separately describes these method procedures.

Figures 1, 3A:
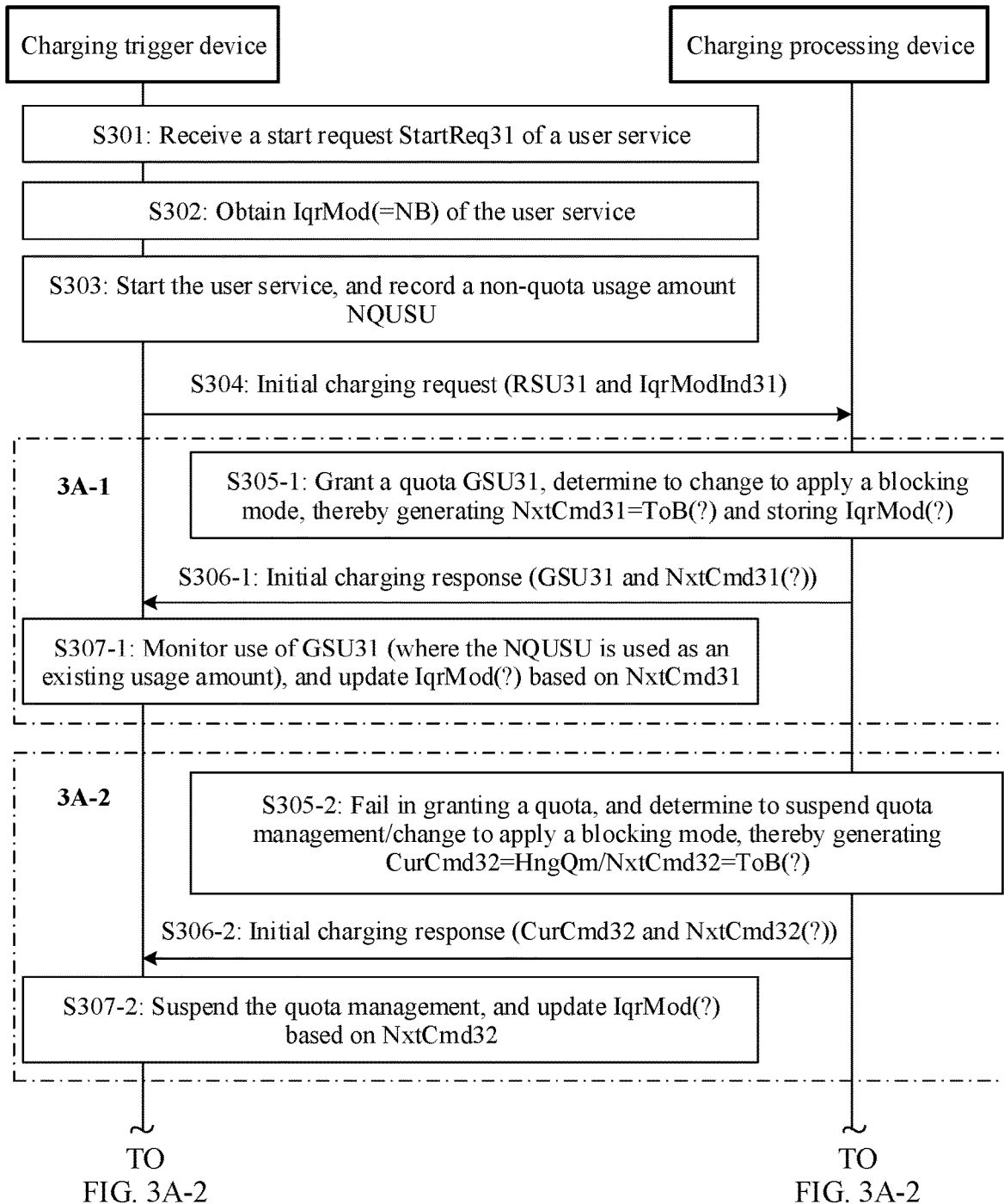
Figures 2, 3A:
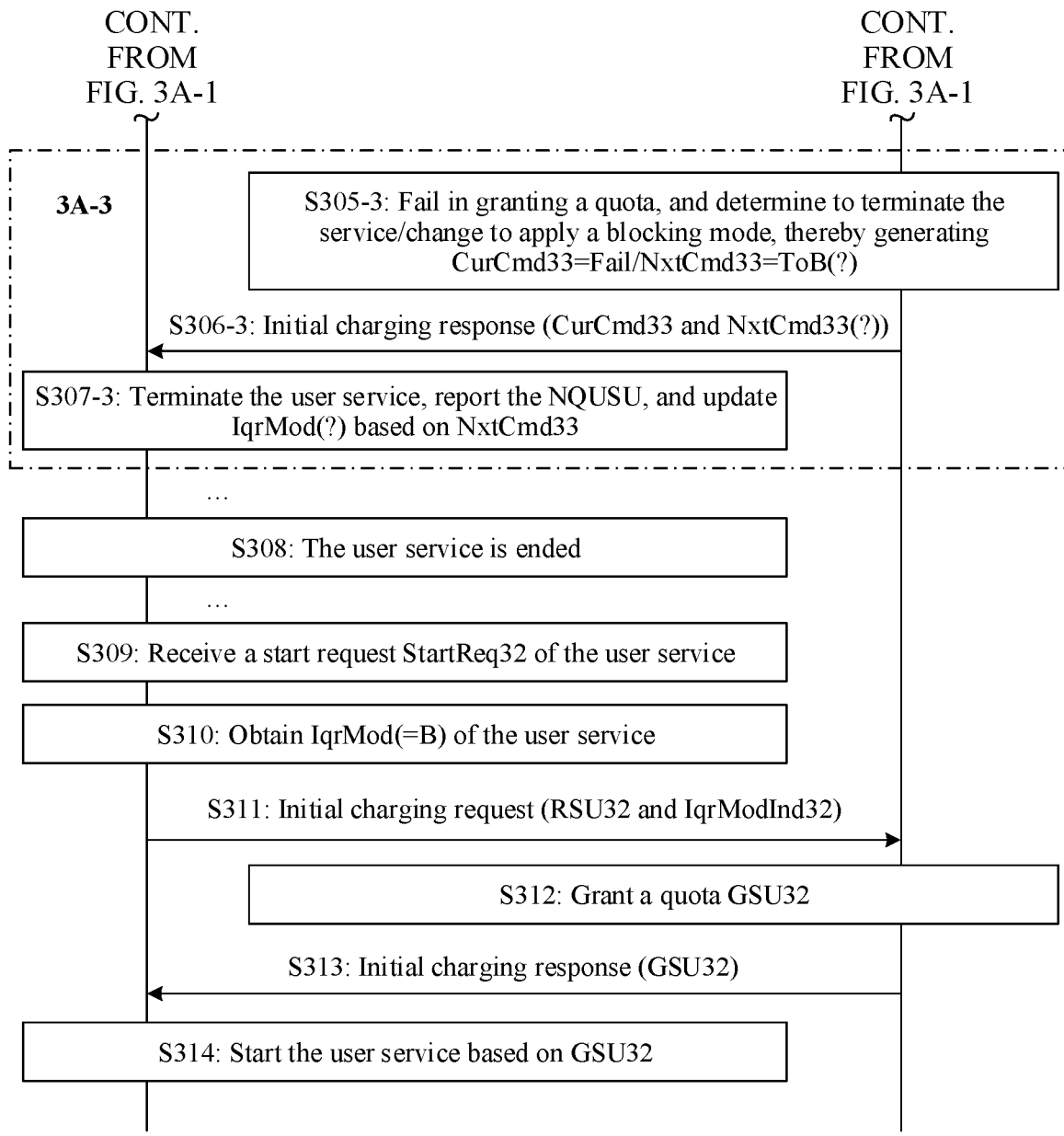

In the method procedure corresponding to FIG. 3A-1 and FIG. 3A-2, a charging trigger device initially applies a non-blocking mode (a first mode) initial quota request for a user service, and then a charging processing device sends a charging control command by using an initial charging response message, so that the charging trigger device adjusts a charging operation, for example, suspends quota management for the user service, terminates the user service, and changes to apply a blocking mode (a second mode) initial quota request for the user service. The method procedure mainly includes the following steps.

Step 301: The charging trigger device receives a start request StartReq31 of the user service.

Specifically, the charging trigger device receives StartReq31 from user equipment.

For example, the user service is a 5G data service. In this case, StartReq31 may be a request message for establishing a PDU session for the data service, or may be an initial data packet in a data flow of the data service when a PDU session is established.

Step 302: The charging trigger device obtains an initial quota request mode IqrMod(=NB) of the user service.

Specifically, the charging trigger device may obtain the initial quota request mode for the user service based on configuration information that is of the user service and that is stored locally in the charging trigger device or in an external storage device, or may alternatively obtain the initial quota request mode for the user service from a policy delivered by a policy control device (for example, the charging trigger device obtains the initial quota request mode for the user service from a charging policy that is of the user service and that is activated by the policy control device; or if no charging policy is activated for the user service, the charging trigger device requests the charging policy of the user service from the policy control device, the policy control device returns the initial quota request mode for the user service as the charging policy of the user service to the charging trigger device, and the charging trigger device obtains the initial quota request mode for the user service from the charging policy).

In this method procedure, it is assumed that the initial quota request mode IqrMod applied for the user service is a non-blocking mode (NB).

Step 303: The charging trigger device starts the user service, and records a non-quota usage amount NQUSU.

Because the initial quota request mode for the user service is the non-blocking mode, the charging trigger device may immediately start the user service without waiting for a quota request result in a subsequent step. In addition, the charging trigger device starts to record the non-quota usage amount NQUSU. The non-quota usage amount is a service usage amount generated by allowing the user service to pass, where the "allowing to pass" is performed by the charging trigger device when the charging processing device does not grant a valid quota for the user service. A 5G data service is used as an example. In this case, the non-quota usage amount of the 5G data service is data traffic generated by allowing the 5G data service to pass, where the "allowing to pass" is performed by the charging trigger device when the charging processing device does not grant a valid quota for the 5G data service.

Step 304: The charging trigger device sends an initial charging request of the user service to the charging processing device, where the initial charging request includes quota request information RSU31 and initial quota request mode indication information IqrModInd31.

Specifically, to request a quota from the charging processing device to keep allowing the user service to pass, the charging trigger device sends an initial charging request message to the charging processing device. The initial charging request message includes the quota request information RSU31 and the initial quota request mode indication information IqrModInd31. Herein, IqrModInd31 includes the initial quota request mode IqrMod(=NB) of the user service.

Different user services may share a quota (for example, a user service is a data flow corresponding to a service identifier in a plurality of data flows corresponding to an RG, and a plurality of user services corresponding to the same rating group share a quota of the rating group). Alternatively, the user service exclusively applies a quota (for example, the user service is a plurality of data flows corresponding to a rating group, and the user service exclusively applies a quota of the rating group). Data structures of charging request messages and initial quota request mode indication information in the charging request messages corresponding to the two cases are respectively shown in the following examples.

(1) The user service exclusively applies the quota (for example, the user service is the plurality of data flows corresponding to the rating group). The charging trigger device may report the initial quota request mode in a unit of a rating group (the charging processing device also subsequently manages the initial quota request mode in a unit of a rating group). In this case, an example of the charging request message is as follows:

```
ChargingDataRequest{
    "MUU"{
        "RG":1; //the rating group serves as a user service identifier
        "IqrMod":"NB"; //IqrModInd31
        "RSU"{
            "Volume":1024;
        }
    }
}
```

It can be noted that MUU is the abbreviation for "Multiple Unit Usage", RG is the abbreviation for "Rating Group", and RSU is the abbreviation for "Requested Service Unit". This also applies to the following.

(2) Different user services share the quota (for example, the user service is a data flow corresponding to a service identifier in a plurality of data flows corresponding to a rating group, and a plurality of user services corresponding to the same rating group share a quota of the rating group). Details are as follows.

It is assumed that there are two user services sharing a quota: a user service Service1 and a user service Service2. In other words, Service1 is a data flow corresponding to Service ID=1 in a rating group RG1, and Service2 is a data flow corresponding to Service ID=2 in RG1. The charging trigger device determines that IqrMod of Service1 is the blocking mode, and IqrMod of Service2 is the non-blocking mode.

When the charging trigger device receives a start request of Service2, if the charging trigger device already has a quota corresponding to the rating group (it is assumed that Service1 is started, and the quota corresponding to the rating group is granted for Service1), the charging trigger device directly applies the quota corresponding to the rating group for Service2. In this case, if the charging trigger device does not apply the non-blocking mode for Service2, the charging trigger device does not report, to the charging processing device, initial quota request mode indication information applied for Service2; or reports that an initial quota request mode applied for Service2 is the blocking mode.

When the charging trigger device receives the start request of Service2, if the charging trigger device does not have the quota corresponding to the rating group, the charging trigger device applies a non-blocking mode initial quota request for Service2. In this case, the initial charging request message sent to the charging processing device carries indication information for indicating that "Service2 applies the non-blocking mode initial quota request". Specifically, there are two methods for reporting the initial quota request mode.

(2-1) The charging trigger device reports the initial quota request mode in a unit of a user service (the charging processing device may also subsequently manage the initial quota request mode in a unit of a user service). In this case, an example of the charging request message is as follows:

```
ChargingDataRequest{
    "MUU"{
        "RG":1; //rating group identifier
        "RSU"{
            "ServiceInfo"{
                "ServiceID":2; //service identifier
                "IsBlocking":"true"; //=NB, IqrModInd31
            }
            "Volume":2048;
        }
    }
}
```

(2-2) The charging trigger device may report the initial quota request mode in a unit of a rating group (the charging processing device may also subsequently manage the initial quota request mode in a unit of a rating group). In this case, an example of the charging request message is as follows:

```
ChargingDataRequest{
    "MUU"{
        "RG":1; //rating group
        "IsBlocking":"true"; //IqrModInd31
        "RSU"{
            "Volume":2048;
        }
    }
}
```

It can be understood that step 303 is not dependent on step 304, that is, step 304 may be performed after, before, or at the same time as step 303.

The charging processing device receives and parses the foregoing initial charging request, obtains RSU31 and IqrModInd31 from the initial charging request, performs charging processing on the user service based on a case specified by IqrModInd31 (that is, the charging trigger device applies the non-blocking mode initial quota request for the user service), generates a current-stage charging control command (CurCmd) and/or a next-stage charging control command (NxtCmd), and delivers the current-stage charging control command and/or the next-stage charging control command to the charging trigger device for execution. The current-stage charging control command and the next-stage charging control command are described as follows.

In this embodiment of this application, the current-stage charging control command is an indication parameter or a command that is provided for the charging trigger device for current-stage execution of the user service, and the next-stage charging control command is an indication parameter or a command that is provided for the charging trigger device for the next-stage user service. The current-stage user service indicates a user service for which a quota is currently requested or that currently consumes a quota. For example, it is assumed that a user service corresponds to a service data flow of a rating group in a 5G data service. Before termination of the service data flow, the user service is referred to as the "current-stage user service". The next-stage user service is relative to the current-stage user service, and indicates the same user service that starts after a current time point. For example, it is assumed that a service data flow that is of a rating group in a data service and that corresponds to a user service is currently allowed to pass. If a start of the service data flow of the user service occurs after the current time point, the started service data flow is referred to as the "next-stage user service". In consideration that user services can be performed in parallel, the current-stage user service and the next-stage user service may coexist in a specific time period.

An example process of generating the current-stage charging control command and the next-stage charging control command is described as follows.

Example 3A-1

Step 305-1: The charging processing device grants a quota GSU31, determines to change to apply the blocking mode initial quota request, generates the next-stage charging control command NxtCmd31=ToB of the user service, and stores the initial quota request mode for the user service.

Specifically, the charging processing device grants the quota GSU31 for the user service based on RSU31. The charging processing device determines based on IqrModInd31 whether the initial quota request mode for the user service is to be changed, and generates NxtCmd31 when determining that the charging trigger device is to change to apply the blocking mode initial quota request. An example value of NxtCmd31 is "ToB" (To Blocking Mode), to indicate the charging trigger device (the charging trigger device 102 or a charging trigger device not shown in FIG. 1) to apply the blocking mode initial quota request for the user service when the charging trigger device receives a next start request (such as a start request StartReq32) of the user service. Optionally, the charging processing device may further record or store the current initial quota request mode for the user service based on IqrModInd31 or NxtCmd31, to apply the current initial quota request mode as input for a next time of determining whether the initial quota request mode for the user service is to be changed. Optionally, the charging processing device may also determine, without based on IqrModInd31, that the charging trigger device is to change to apply the blocking mode initial quota request, and further generate NxtCmd31.

For example, the charging processing device learns, based on IqrModInd31, that the current charging trigger device applies the non-blocking mode initial quota request for the user service. When determining that the user account no longer meets a required condition for the non-blocking mode initial quota request (for example, no longer meets a condition that "a remaining validity period of a tariff plan of the account is greater than a threshold", or meets that "a decrease rate of an account balance exceeds a threshold), the charging processing device determines that the charging trigger device is to change to apply the blocking mode initial quota request for the user service, and further generates NxtCmd31.

For another example, the charging processing device may also directly generate NxtCmd31 when determining that the user account no longer meets the required condition for the non-blocking mode initial quota request, regardless of a specific mode initial quota request applied by the charging trigger device for the user service.

It can be understood that an indication manner of the NxtCmd command in this embodiment of this application is an example instead of limitation. In addition to the foregoing indication manner, another indication manner may be further used. For example, "enable NB" may indicate that the non-blocking mode initial quota request is to be applied, and "disable NB" may indicate that the blocking mode initial quota request is to be applied.

Specifically, in order that the charging processing device can know the initial quota request mode applied by the charging trigger device for the user service when the initial quota request mode is not reported in an interim charging request, the charging processing device may further record or store the currently effective initial quota request mode in current charging context. If NxtCmd31 is not delivered previously, the charging processing device records or stores the initial quota request mode IqrMod of the user service based on IqrModInd31. If the charging processing device updates the initial quota request mode, the charging processing device records or stores the updated initial quota request mode (where for example, when NxtCmd31=ToB, the charging processing device is to record or store the quota request mode for the user service as the blocking mode). It can be understood that the foregoing step of generating NxtCmd31 is optional and has a corresponding "?" mark in the method flowchart. If a "?" mark is used as a suffix to an operation in the flowchart, it indicates that the operation is an optional operation. This indication manner is applicable to all embodiments of this application. Details are not described again.

Step 306-1: The charging processing device sends an initial charging response message to the charging trigger device, where the initial charging response message includes GSU31 and NxtCmd31.

The initial charging response message is a response message corresponding to the foregoing initial charging request message. For ease of description, in this embodiment of this application, the initial charging response message is sometimes referred to as an initial charging response. This is not repeatedly described in the following.

Herein, NxtCmd31 is optional and has a corresponding "?" mark in the method flowchart. If a "?" mark is used as a suffix to a message field in the method flowchart, it indicates that the message field is an optional. This indication manner is applicable to all embodiments of this application. Details are not described again.

It can be understood that the initial quota request mode for the user service may also be recorded or stored in step 305-1 after the initial charging response message is successfully sent in this step.

Depending on whether different user services share a quota, examples of data structures of the charging response message and NxtCmd in the message are respectively as follows (with reference to the example of step 304).

(1) The user service exclusively shares the quota. The charging processing device may manage the initial quota request mode in a unit of a rating group. An example of the charging response message is as follows:

```
ChargingDataResponse{
  "MUI"{
    "RG":1; //rating group
    "IqrMod":"B"; //NxtCmd31
    "GSU"{
      "Volume":512;
    }
  }
}
```

It can be noted that MUI is the abbreviation for "Multiple Unit Information" (multiple unit information), and GSU is the abbreviation for "Granted Service Unit" (granted service unit).

(2) Different user services share the quota. Step 304 corresponds to two methods for reporting the initial quota request mode (based on Service1 and Service2 in step 304).

(2-1) The charging processing device may manage the initial quota request mode in a unit of a user service. An example of the charging response message is as follows:

```
ChargingDataResponse{
    "MUI"{
        "RG":1;
        "GSU"{
            "ServiceInfo"{
                "ServiceID":2;
                "NBMode":"disabled"; //NxtCmd31, disable the non-
blocking mode
            }
            "Volume":1024;
        }
    }
}
```

(2-2) The charging processing device may also manage the initial quota request mode in a unit of a rating group.

Example 1: The charging trigger device applies the blocking mode (or disables the non-blocking mode) for all user services in the entire rating group. An example of the charging response message is as follows:

```
ChargingDataResponse{
    "MUI"{
        "RG":1;
        "NBMode"/"disabled"; //NxtCmd31, disable the non-blocking
mode for all the user services in the rating group, that is, the non-blocking
mode for Service2 is disabled (changed to the blocking mode), and
because Service1 is originally in the blocking mode, Service1 is not
affected by the disabling (still in the blocking mode)
        "GSU"{
            "Volume":2048;
        }
    }
}
```

It is assumed that the blocking mode is applied for some user services (for example, the user service Service1 in the example of step 304) in the rating group. In this case, it is equivalent that (NxtCmd31 in) the response message only works on the user service (for example, the user service Service2 in the example of step 304) for which the non-blocking mode is previously applied.

Example 2: If the non-blocking mode for Service2 is disabled by the charging processing device, the charging trigger device determines to re-enable the original initial quota request mode for the user service Service2 (that is, the non-blocking mode is re-enabled). An example of the charging response message is as follows:

```
ChargingDataResponse{
    "MUI"{
        "RG":1;
        "NBMode":"enabled"; //NxtCmd31, re-enable the disabled initial
quota request mode, that is, the initial quota request mode for Service2 is
changed to the original non-blocking mode again, and because Service1
is originally in the blocking mode, the blocking mode is still applied for
Service1 after the re-enabling.
        "GSU"{
            "Volume":2048;
        }
    }
}
```

It is assumed that the blocking mode is applied for some user services (for example, a user service whose ServiceID is 1 in the example of step 304) in the rating group. In this case, it is equivalent that (NxtCmd31 in) the response message only works on the user service (for example, a user service whose ServiceID is 2 in the example of step 304) for which the non-blocking mode is previously applied.

Step 307-1: The charging trigger device monitors use of GSU31 (where the NQUSU is used as the existing usage amount), and updates the initial quota request mode for the user service based on NxtCmd31.

Specifically, the charging trigger device receives and parses the initial charging response message in step 306-1, obtains GSU31 and NxtCmd31 (if exists) from the initial charging response message, and monitors use of GSU31. In this case, the recorded non-quota usage amount NQUSU of the user service is used as the existing usage amount of the quota GSU31.

Specifically, the charging trigger device updates the initial quota request mode for the user service based on NxtCmd31. The charging trigger device obtains a new initial quota request mode for the user service based on an NxtCmd31 parameter, and in correspondence with step 302, stores the initial quota request mode in configuration information that is of the user service and that is stored locally in the charging trigger device or in an external storage device. The initial quota request mode stored in the external storage device may be shared by a plurality of charging trigger devices. For the data service, after the locally effective initial quota request mode in the charging policy of the user service is updated, a policy update request is further sent to the policy control device. The policy update request includes indication information for updating the initial quota request mode for the user service. Alternatively, the locally effective initial quota request mode in the charging policy of the user service is not updated, and a policy update request is directly sent to the policy control device. The update request includes indication information for updating the initial quota request mode for the user service. Then, the policy control device delivers a new charging policy of the user service in a response message of the policy update request. The new charging policy includes the updated initial quota request mode for the user service. The indication information may be disabling the non-blocking mode to be applied for the user service, or indicating to apply the blocking mode for the user service. This embodiment of this application does not limit a data structure and a storage location of the initial quota request mode stored in the charging trigger device. For example, the initial quota request mode may be set in a data structure of configuration data of the user service.

```
ServiceProfile{
    "userID":"+8613800000000"
    "SID":"1"//user service identifier
    ...//other configuration parameters of the user service
    "IqrModInd"{
        "IqrMod":"B"//the initial quota request mode for the
user service is the blocking mode
    }
}
```

Go to step 308.

Example 3A-2

Step 305-2: The charging processing device fails in granting a quota, and determines that the charging trigger device is to suspend quota management/change to apply the blocking mode initial quota request, thereby generating CurCmd32=HngQm/NxtCmd32=ToB and storing the initial quota request mode for the user service.

Specifically, when the charging processing device fails in granting a quota for the user service, the charging processing device determines that the charging trigger device is to suspend the quota management for the user service, and therefore the charging processing device generates the current-stage charging control command CurCmd32 for suspending the quota management. For example, a value of CurCmd32 is "HngQm" (Suspend quota management, suspend quota management). Optionally, the charging processing device may further determine that the charging trigger device is to change to apply the blocking mode initial quota request for the user service, and generate the next-stage charging control command NxtCmd32. An example value of NxtCmd32 is "ToB". Optionally, the charging processing device may further update the initial quota request mode for the user service based on NxtCmd32. The quota granting failure includes quota granting failure caused due to an insufficient balance, a rating failure, a failure in accessing the user service, and the like. In this embodiment of this application, the quota granting failure is mainly described by using an example of a quota granting failure. Details are not repeatedly described in the following.

An example of generating CurCmd32 is as follows.

For example, after the quota granting failure, the charging processing device further determines, based on the configuration information of the user service (for example, a type of the user service is an uninterruptible service, or a user subscription agreement indicates that the user service is uninterruptible), that the charging trigger device is to suspend the quota management for the user service, and generates the current-stage charging control command CurCmd32 whose value is "HngQm". Optionally, CurCmd32 may further include indication information indicating the quota granting failure, for example, "Fail".

In actual deployment, suspending the quota management may be implemented through changing from an online charging mode to an offline charging mode (equivalent to non-quota management) for the user service. The charging trigger device may change to apply an offline charging mode for the user service based on the command CurCmd32. Alternatively, suspending the quota management may also be implemented through changing from conventional quota management to unlimited quota management for the user service. Therefore, the charging trigger device may apply an unlimited quota or a sufficient quota based on the command CurCmd32, and record a usage amount of the sufficient quota.

The foregoing conventional quota management indicates that the charging processing device allocates a quota for the user service based on a balance in a user account. The charging trigger device allows, based on the quota granted by the charging processing device, the user service to pass, and triggers transmission of a charging request for requesting a quota to the charging processing device because the quota is used up.

The unlimited quota management indicates a quota suspend indication (such as "HngQm" above) delivered by the charging processing device. The charging trigger device does not limit a quota usage amount for the user service based on this indication (does not trigger a quota request because the quota is used up), and records the quota usage amount.

For the quota suspend management, if the charging trigger device and the charging processing device implement both changing to the offline charging mode (non-quota management) and unlimited quota management, the charging processing device and the charging trigger device both have two options; in this case, the indication parameter "HngQm" may be replaced with "ToOff" (to offline charging) or "ToNLQM" (to no limited quota management) for distinguishing.

For generating the next-stage charging control command NxtCmd32, refer to related descriptions in step 305-1.

For recording or storing the initial quota request mode for the user service, refer to related descriptions in step 305-1.

Step 306-2: The charging processing device sends the initial charging response message to the charging trigger device, where the initial charging response message includes CurCmd32 and NxtCmd32.

Herein, NxtCmd32 is optional. The charging processing device may deliver, by using the subsequent interim charging response message, an indication parameter for changing the initial quota request mode for the user service to the blocking mode. For details, refer to the related descriptions of step 306-1.

Step 307-2: The charging trigger device suspends the quota management, and updates the initial quota request mode for the user service based on NxtCmd32.

Specifically, the charging trigger device receives and parses the initial charging response message in step 306-2, obtains CurCmd32 and NxtCmd32 (if exists) from the initial charging response message, and suspends the quota management for the user service based on CurCmd32. Specifically, the charging trigger device changes to apply an offline charging mode (equivalent to non-quota management) for the user service or performs unlimited quota management on the user service. The previously recorded non-quota usage amount of the user service is reported as a USU to the charging processing device for charging processing.

Similarly, the charging trigger device further updates the initial quota request mode for the user service based on NxtCmd32. For details, refer to related descriptions in step 307-1.

Go to step 308.

Example 3A-3

Step 305-3: The charging processing device fails in granting a quota, and determines that the user service is to be terminated/the blocking mode initial quota request is to be applied, so generate CurCmd33=Fail/NxtCmd33=ToB and store the initial quota request mode for the user service.

This step is similar to step 305-2. Different from step 305-2, after the quota granting failure, the charging processing device further determines that the charging trigger device is to terminate the user service (for example, the type of the user service is an interruptible service, or the user subscription agreement indicates that the user service is an interruptible service), for example, an entertainment service such as a VR service. In this case, the charging processing device generates the current-stage charging control command CurCmd33=Fail.

It can be understood that, in this embodiment of this application, an indication manner of the command CurCmd for terminating the user service is an example instead of limitation. In addition to the foregoing indication manner, another indication manner may be further used. For example, specific result code may also indicate the charging trigger device to terminate the user service.

For storing the initial quota request mode for the user service, refer to related descriptions in step 305-1. Step 306-3: The charging processing device sends the initial charging response message to the charging trigger device, where the initial charging response message includes CurCmd33 and NxtCmd33.

This step is similar to step 306-2. Details are not described herein again.

Step 307-3: The charging trigger device terminates the user service, reports the NQUSU, and updates the initial quota request mode for the user service based on NxtCmd33.

Updating the initial quota request mode for the user service based on NxtCmd33 is similar to step 307-1.

Specifically, the charging trigger device terminates the user service based on "Fail" indication information in CurCmd33. Optionally, the charging trigger device further reports a currently reported non-quota usage amount NQUSU.

Because the charging processing device indicates to terminate the user service, step 308 is directly performed after this step to end the user service.

It can be understood that, in this step, a sequence between terminating the user service and updating the initial quota request mode for the user service is not fixed.

Step 308: The user service is ended.

Specifically, the end of the user service may be triggered by a user or by the quota granting failure.

Step 309: The charging trigger device receives a start request StartReq32 of the user service.

Specifically, the charging trigger device receives StartReq32 from the user equipment.

A next start request of the user service may be received by the charging trigger device in steps 301 to 308, or by another charging trigger device. Therefore, the charging trigger device in step 309 and that in steps 301 to 308 may be the same charging trigger device, or may be different charging trigger devices.

Step 310: The charging trigger device obtains an initial quota request mode IqrMod(=B) of the user service.

This step is similar to step 302. Details are not described herein again. In this step, the charging trigger device learns that the blocking mode initial quota request is to be applied for the user service. Therefore, the charging trigger device determines that the quota is to be first requested before the user service is started.

Step 311: The charging trigger device sends an initial charging request message of the user service to the charging processing device, where the initial charging request message includes quota request information RSU32 and initial quota request mode indication information IqrModInd32.

Specifically, because the initial quota request mode for the user service is the blocking mode (IqrMod=B), the charging trigger device determines to first obtain the quota. It is assumed that the charging trigger device does not have an available quota for the user service. In this case, the charging trigger device first sends the initial charging request message to request the quota. The initial charging request message includes the quota request information RSU32 and the initial quota request mode indication information IqrModInd32. Herein, IqrModInd32 is similar to IqrModInd31 in step 304.

Step 312: The charging processing device grants a quota GSU32.

Specifically, the charging processing device receives and parses the initial charging request message in step 311, obtains the quota request information RSU32 and the initial quota request mode indication information IqrModInd32 from the initial charging request message, grants the quota GSU32 to the user service, and records or stores the current initial quota request mode for the user service based on IqrModInd32, to apply the initial quota request mode for the user service as input for a next time of determining whether to change the initial quota request mode for the user service. For a process of granting the quota GSU32 and recording or storing the current initial quota request mode for the user service based on IqrModInd32, refer to related descriptions in step 305-1.

Step 313: The charging processing device sends an initial charging response to the charging trigger device, where the initial charging response includes the granted quota GSU32.

Step 314: The charging trigger device starts the user service based on GSU32.

In the foregoing steps 309 to 314, the initial quota request mode for the user service may be further changed. For details, refer to steps 341 to 346 in FIG. 3C. After step 314, the initial quota request mode for the user service may also be changed. For details, refer to steps 367 to 370 in FIG. 3D.

In the process of step 301 to step 303, the user service is started before the quota is requested. Therefore, this is an initial quota request process in the non-blocking mode. In the process of step 309 to step 314, the user service is started after the quota is requested. Therefore, this is a blocking mode initial quota request process. This sequence change is caused due to the charging control command delivered by the charging processing device.

In the method procedure corresponding to FIG. 3A-1 and FIG. 3A-2, the charging processing device may determine, based on the applied initial quota request mode when the quota granting fails, whether the current user service is started; further determine a proper processing measure (for example, through indicating the charging trigger device to suspend quota management or terminate the user service) to process the current-stage user service, thereby preventing a current-stage user service risk due to an operation of a charging system. In addition, when a credit control risk is found, in the method procedure, the charging processing device may further change, in a timely manner, the initial quota request mode applied by the charging trigger device for the user service from the non-blocking mode to the blocking mode, to prevent poor user experience when the next-stage user service is started and then is immediately terminated, and avoid a DOS attack on the charging system.

In consideration that information related to the user service (for example, an account balance) dynamically changes, the charging processing device may not always evaluate the credit control risk when processing the initial charging request message, but may possibly evaluate the credit control risk when the credit control risk changes with the information related to the user service to some extent after the user service is started. Therefore, this embodiment of this application provides a method procedure corresponding to FIG. 3B-1 and FIG. 3B-2.

Figures 1, 3B:
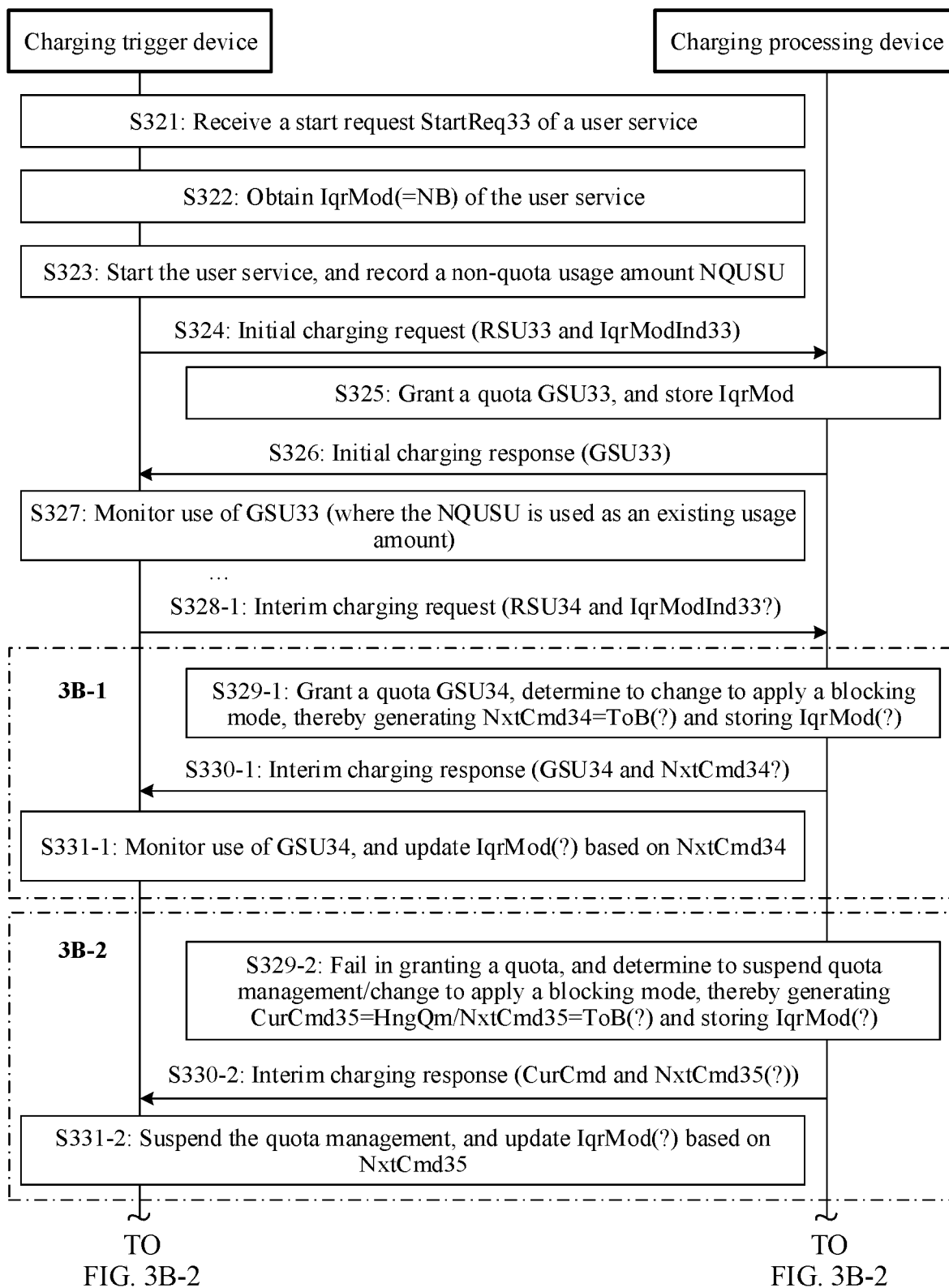
Figures 2, 3B:
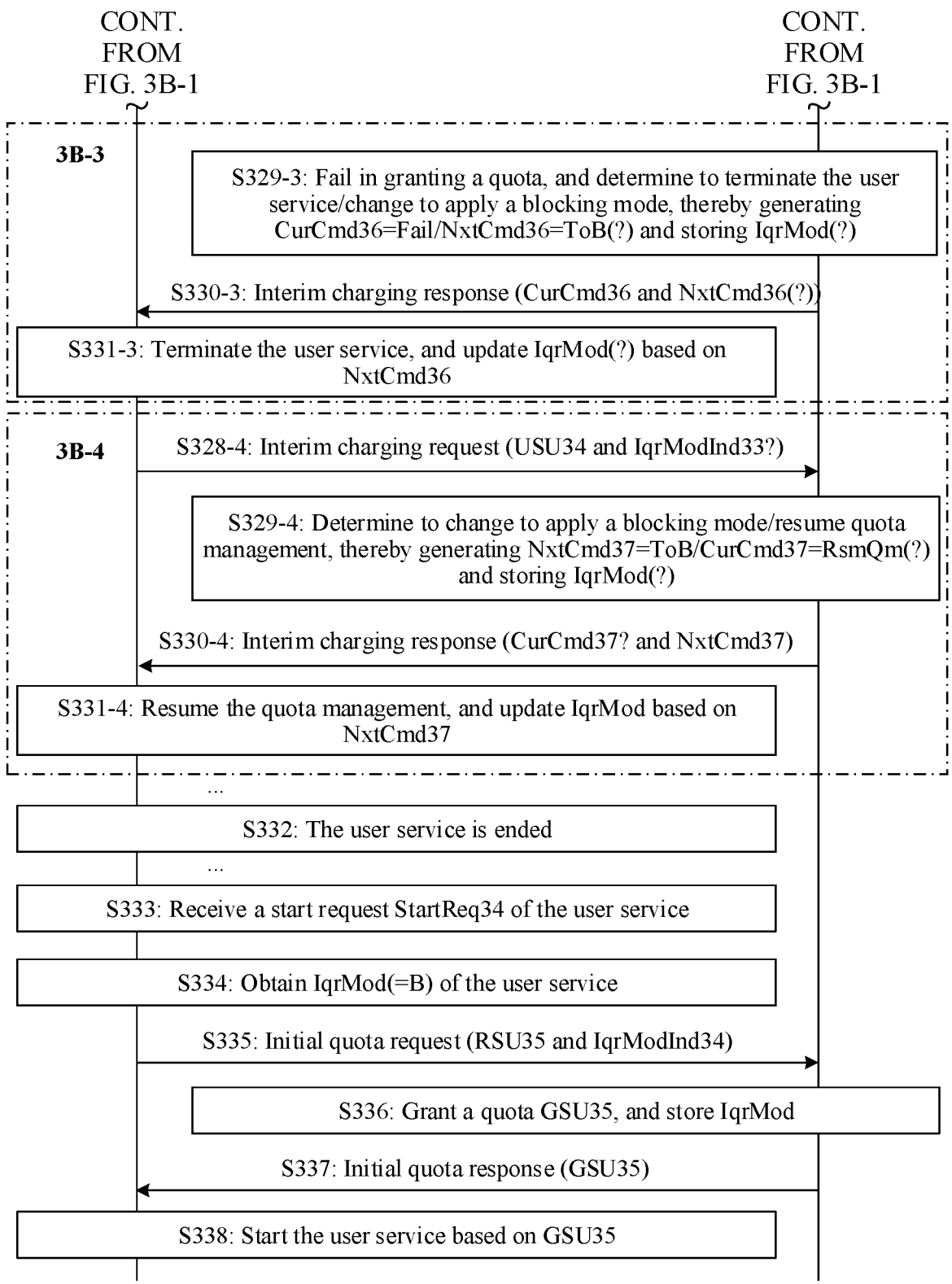

In the method procedure corresponding to FIG. 3B-1 and FIG. 3B-2, a charging trigger device initially applies a non-blocking mode (a first mode) initial quota request for a user service, and then a charging processing device sends a charging control command by using an interim charging response message, so that the charging trigger device adjusts a charging operation, for example, suspends/resumes quota management, terminates the user service, and changes to apply a blocking mode (a second mode) initial quota request for the user service. The method procedure mainly includes the following steps.

Step 321: The charging trigger device receives a start request StartReq33 of the user service.

For content of this step, refer to step 301.

Step 322: The charging trigger device obtains an initial quota request mode IqrMod(=NB) of the user service.

For content of this step, refer to step 302.

Step 323: The charging trigger device starts the user service, and records a non-quota usage amount NQUSU.

For content of this step, refer to step 303.

Step 324: The charging trigger device sends an initial charging request to the charging processing device, where the initial charging request includes quota request information RSU33 and initial quota request mode indication information IqrModInd33.

For content of this step, refer to step 304.

Step 325: The charging processing device grants a quota GSU33, and stores the current initial quota request mode for the user service based on IqrModInd33.

For content of this step, refer to step 305-1. The difference is that it is determined that the initial quota request mode for the user service is to be changed in step 305-1, and it is determined that the initial quota request mode for the user service is not to be changed in this step (a reason may be, for example, a credit control risk is not found).

Step 326: The charging processing device sends an initial charging response to the charging trigger device, where the initial charging response includes GSU33.

Step 327: The charging trigger device monitors use of GSU33 (where the NQUSU is used as an existing usage amount).

Specifically, the charging trigger device receives and parses the initial charging response message in step 326, obtains GSU33 from the initial charging response message, and manages use of GSU33. In this case, the recorded non-quota usage amount NQUSU of the user service is used as the existing usage amount of the quota GSU33.

Afterwards, the charging trigger device requests charging processing from the charging processing device by using an interim charging request. As shown in step 328-1 and step 328-4, the interim charging request may include quota request information RSU, or may include a usage amount USU.

Step 328-1: The charging trigger device sends the interim charging request to the charging processing device, where the interim charging request includes quota request information RSU34 and the initial quota request mode indication information IqrModInd33.

Specifically, to request a quota from the charging processing device to keep allowing the user service to pass, the charging trigger device sends the interim charging request message to the charging processing device. The interim charging request message includes the quota request information RSU34 and the initial quota request mode indication information IqrModInd33. Herein, IqrModInd33 is optional. When the interim charging request does not include IqrModInd33, the charging processing device determines, based on the current initial quota request mode that is of the user service and that is stored in step 325, that the charging trigger device applies the non-blocking mode initial quota request for the user service.

After the interim charging request in step 328-1 is received, different charging processing is performed based on a status of the account information of the user service and different information about the user service. Examples are as follows.

Example 3B-1

Step 329-1: The charging processing device grants a quota GSU34, determines to change to apply the blocking mode, generates NxtCmd34=ToB, and stores IqrMod.

Generating NxtCmd34 is optional. For content of this step, refer to step 305-1.

Step 330-1: The charging processing device sends an interim charging response to the charging trigger device, where the interim charging response includes GSU34 and NxtCmd34.

This step is similar to step 306-1. Except that the initial charging response message is replaced with the interim charging response message, for other details, refer to step 306-1.

Step 331-1: The charging trigger device monitors use of GSU34, and updates the initial quota request mode for the user service based on NxtCmd34.

This step is similar to step 307-1. Different from step 307-1, the non-quota usage amount is not to be deducted from GSU34 in this step because the non-quota usage amount does not exist.

Go to step 332.

Example 3B-2

Step 329-2: The charging processing device fails in granting a quota for the user service, and determines that quota management for the user service is to be suspended/the blocking mode initial quota request is to be applied, thereby generating CurCmd35=HngQm/NxtCmd35=ToB and store IqrMod.

For content of this step, refer to step 305-2.

Step 330-2: The charging processing device sends an interim charging response to the charging trigger device, where the interim charging response includes CurCmd35 and NxtCmd35.

This step is similar to step 306-2. Except that the initial charging response message is replaced with the interim charging response message, for other details, refer to step 306-2.

Step 331-2: The charging trigger device suspends the quota management, and updates the initial quota request mode for the user service based on NxtCmd35.

For content of this step, refer to step 307-2.

Go to step 332.

Example 3B-3

Step 329-3: The charging processing device fails in granting a quota for the user service, and determines that the user service is to be terminated/the blocking mode initial quota request is to be applied, thereby generating CurCmd36=Fail/NxtCmd36=ToB and store IqrMod.

For content of this step, refer to step 305-3.

Step 330-3: The charging processing device sends an interim charging response to the charging trigger device, where the interim charging response includes CurCmd36 and NxtCmd36.

This step is similar to step 306-3. Except that the initial charging response message is replaced with the interim charging response message, for other details, refer to step 306-3.

Step 331-3: The charging trigger device terminates the user service, and updates the initial quota request mode for the user service based on NxtCmd36.

For content of this step, refer to step 307-3.

Go to step 333.

Example 3B-4

Step 328-4: The charging trigger device sends the interim charging request to the charging processing device, where the interim charging request includes usage amount information USU34 and the initial quota request mode indication information IqrModInd33.

Specifically, to report the usage amount information to the charging processing device for charging processing, the charging trigger device sends the interim charging request message to the charging processing device. The interim charging request message includes the usage amount information USU34. In other that the charging processing device learns of the initial quota request mode for the user service, the interim charging request may further include the initial quota request mode indication information IqrModInd33. In other words, IqrModInd33 is optional. For content of IqrModInd33, refer to IqrModInd31 in step 304. When the interim charging request does not include IqrModInd33, the charging processing device determines, based on the current initial quota request mode that is of the user service and that is stored in step 325, that the charging trigger device previously applies the non-blocking mode initial quota request for the user service.

After the interim charging request in step 328-2 is received, a charging processing process is performed based on a status of the account information of the user service and information about the user service. An example of the charging processing process is as follows.

Step 329-4: The charging processing device determines that the blocking mode initial quota request is to be applied/the quota management for the user service is to be resumed, thereby generating NxtCmd37=ToB/CurCmd37=RsmQm and storing IqrMod.

Specifically, the charging processing device receives and parses the interim charging request described in step 328-4, and obtains the usage amount information USU34 and the initial quota request mode indication information IqrModInd33 (if the field exists) from the interim charging request. The charging processing device performs account balance deduction or writes USU34 into a bill based on USU34, and determines based on IqrModInd33 whether the initial quota request mode for the user service is to be changed. For a specific method of determining, refer to step 305-1. When determining that the initial quota request mode for the user service is to be changed to the blocking mode, the charging processing device may further determine whether the quota management for the user service is suspended (for example, change to offline charging, where whether the quota management for the user service is currently suspended is recorded in the charging processing device), and may further determine that the quota management is to be resumed. In this case, a quota may be granted to the user service. In this case, although the interim charging request message includes USU but does not include RSU, that is, no quota request information, the charging processing device determines a granted quota amount GSU34X based on configuration information or a charging policy, and/or generates a current-stage charging control command CurCmd37 whose value is "RsmQm" (resume quota management), to indicate the charging trigger device to immediately resume the quota management for the user service. To resume the quota management for the user service, the charging processing device may send any one or two of CurCmd37 and GSU34X. If the charging trigger device sends only CurCmd37, after receiving an indication parameter, the charging trigger device may send, to the charging processing device based on the indication parameter, the charging request message for requesting a quota for the user service. If charging trigger device sends only GSU34X, it is equivalent that GSU34X indicates the charging trigger device to resume the quota management for the user service. Therefore, the charging trigger device may apply the granted quota GSU34X for the user service on this basis, and continue to send, to the charging processing device, the charging request message for requesting the quota for the user service.

For how to determine that the non-blocking mode initial quota request can no longer be applied, refer to related descriptions of the method procedure corresponding to FIG. 3A-1 and FIG. 3A-2. Factors of the process in which the charging processing device determines that the quota management for the user service is to be resumed may include: determining that the initial quota request mode for the user service is to be changed to the blocking mode, and further determining that a credit control risk currently exists.

In this way, the credit control risk of the current-stage user service can be reduced through resuming the quota management, and the credit control risk of the next-stage user service can be reduced through changing the initial quota request mode for the user service to the blocking mode.

It can be understood that, in this embodiment of this application, an indication manner of the command CurCmd for resuming the quota management is an example instead of limitation. In addition to the foregoing manner, another manner may be used. For example, "enable QM" may indicate the charging trigger device to resume the quota management, and "disable QM" may indicate the charging trigger device to suspend the quota management.

For a process in which the charging processing device records or stores the initial quota request mode IqrMod of the user service, refer to related descriptions of the method procedure corresponding to FIG. 3A-1 and FIG. 3A-2, for example, steps 305-1 and 305-2.

Step 330-4: The charging processing device sends an interim charging response to the charging trigger device, where the interim charging response includes CurCmd37, GSU34X, and NxtCmd37.

For content of this step, refer to the descriptions of step 330-3. For whether an optional parameter is carried, refer to specific descriptions of parameter generation in step 329-4.

Step 331-4: The charging trigger device resumes the quota management, and updates the initial quota request mode for the user service based on NxtCmd37.

Specifically, the charging trigger device receives and parses the interim charging response in step 330-4, and performs the following operation.

If the charging response includes only GSU34X (but no CurCmd37=RsmQm and the like), the charging trigger device resumes the quota management for the user service, and applies GSU34X for the user service (allows, based on GSU34X, the user service to pass).

Alternatively, if the charging response includes only CurCmd37=RsmQm (but no GSU34X), the charging trigger device resumes the quota management for the user service, and sends the charging request message for requesting a quota to the charging processing device.

Alternatively, if the charging response includes GSU34X and CurCmd37=RsmQm, the charging trigger device resumes the quota management for the user service based on CurCmd37=RsmQm, and applies GSU34X for the user service (allows, based on GSU34X, the user service to pass).

For updating the initial quota request mode for the user service based on NxtCmd37, refer to related descriptions in step 307-1.

Step 332: The user service is ended.

For content of this step, refer to step 308.

Step 333: The charging trigger device receives a start request StartReq34 of the user service.

For content of this step, refer to step 309.

Step 334: The charging trigger device obtains IqrMod(=B) of the user service.

For content of this step, refer to step 310.

Step 335: The charging trigger device sends an initial charging request to the charging processing device, where the initial charging request includes quota request information RSU35 and the initial quota request mode indication information IqrModInd34.

For content of this step, refer to step 311.

Step 336: The charging processing device grants a quota GSU35, and stores IqrMod.

For content of this step, refer to step 312.

Step 337: The charging processing device sends an initial charging response to the charging trigger device, where the initial charging response includes the granted quota GSU35.

For content of this step, refer to step 313.

Step 338: The charging trigger device starts the user service based on GSU35.

For content of this step, refer to step 314.

In the foregoing steps 333 to 338, the initial quota request mode for the user service may be further changed. For details, refer to steps 341 to 346 in FIG. 3C. After step 338, the initial quota request mode for the user service may also be changed. For details, refer to steps 367 to 370 in FIG. 3D.

In comparison with the method procedure corresponding to FIG. 3A-1 and FIG. 3A-2, the foregoing method procedure corresponding to FIG. 3B-1 and FIG. 3B-2 enables the charging processing device to have more determining opportunities, and balance a credit risk control requirement and an access delay requirement (without waiting for a user service to be started again) in a more timely manner.

The foregoing method procedures corresponding to FIG. 3A-1 and FIG. 3A-2 and FIG. 3B-1 and FIG. 3B-2 may be used in a scenario in which an existing initial quota request mode by a charging trigger device is a non-blocking mode. For a scenario in which an existing initial quota request mode by a charging trigger device is a blocking mode, embodiments of this application provide method procedures corresponding to FIG. 3C and FIG. 3D.

Figure 3C:
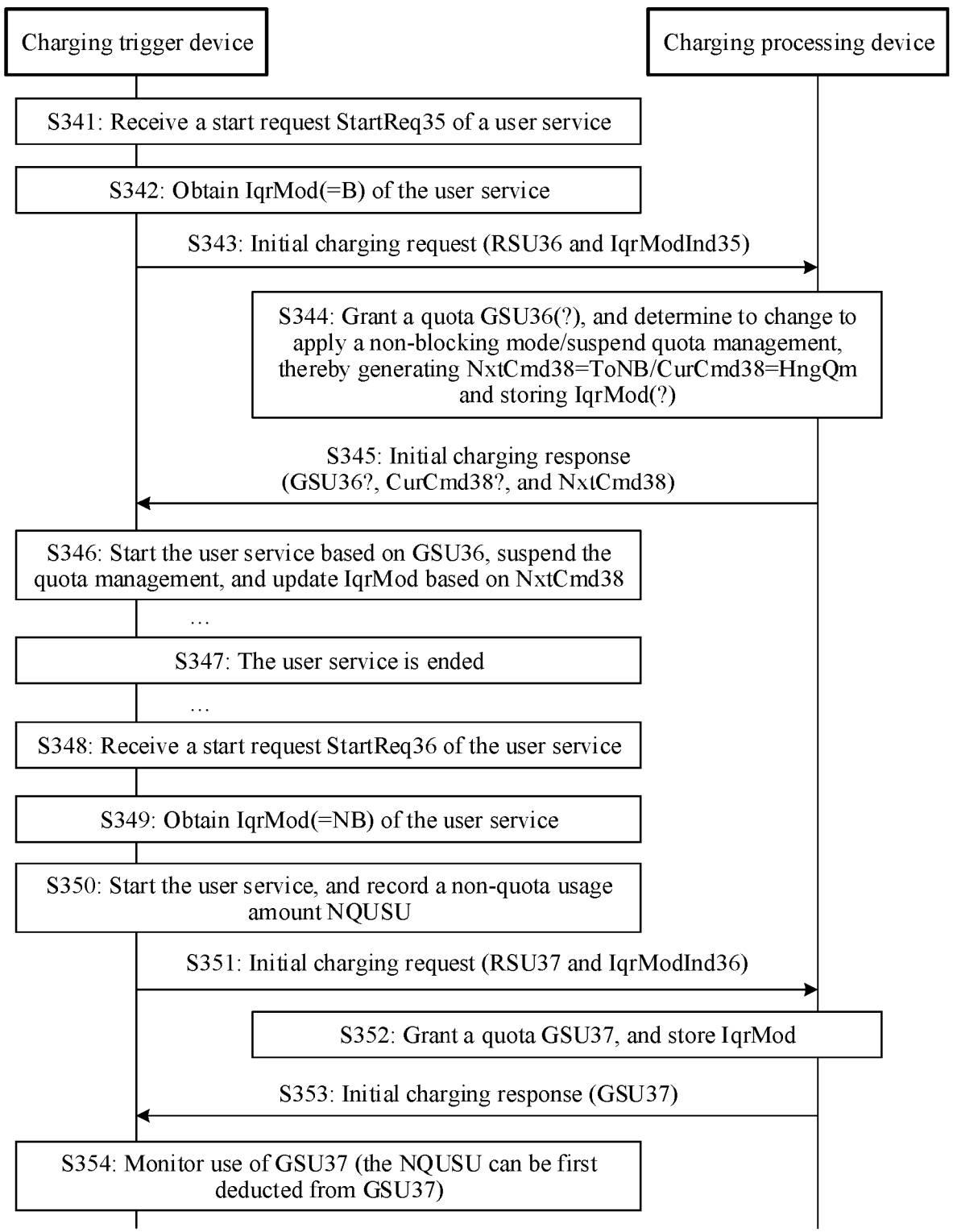
FIG. 3C is a second flowchart of a user service processing method performed by a charging processing device based on an initial charging response message according to an embodiment of this application.

In the method procedure corresponding to FIG. 3C, a charging trigger device initially applies a blocking mode (a first mode) initial quota request for a user service, and then a charging processing device sends a charging control command by using an initial charging response message, so that the charging trigger device adjusts a charging operation, for example, suspends quota management and changes to apply a non-blocking mode (a second mode) initial quota request for the user service. The method procedure mainly includes the following steps.

Step 341: The charging trigger device receives a start request StartReq35 of the user service.

For content of this step, refer to step 301.

Step 342: The charging trigger device obtains an initial quota request mode IqrMod(=B) of the user service.

For content of this step, refer to step 302. Different from this step, the initial quota request mode that is of the user service and that is obtained in this step is the blocking mode.

Step 343: The charging trigger device sends an initial charging request to the charging processing device, where the initial charging request includes quota request information RSU36 and the initial quota request mode indication information IqrModInd35.

Because the initial quota request mode is the blocking mode, the charging trigger device first requests a quota from the charging processing device before the user service is started. Specifically, the charging trigger device sends the initial charging request to the charging processing device. The initial charging request includes the quota request information RSU36 and the initial quota request mode indication information IqrModInd35. For content of IqrModInd35, refer to IqrModInd31 in step 304.

The charging processing device receives and parses the foregoing initial charging request, performs charging processing on the user service based on a case indicated by IqrModInd35 (that is, the charging trigger device applies the blocking mode initial quota request for the user service), generates a current-stage charging control command CurCmd and/or a next-stage charging control command NxtCmd, and delivers the current-stage charging control command and/or the next-stage charging control command to the charging trigger device for execution.

Step 344: The charging processing device grants a quota GSU36, determines to apply the non-blocking mode/suspend quota management, generates NxtCmd38=ToNB/CurCmd38=HngQm, and stores IqrMod.

Specifically, when determining a requirement condition for the non-blocking mode is met, the charging processing device determines, based on a case indicated by IqrModInd35, to change to apply the non-blocking mode initial quota request for the user service, to further generate NxtCmd38. Optionally, when determining a requirement condition for the non-blocking mode is met, the charging processing device may not determine, based on a case indicated by IqrModInd35, to apply the non-blocking mode initial quota request for the user service, to further generate NxtCmd38. Optionally, when the requirement condition for the non-blocking mode is met, the charging processing device may further suspend the current quota management for the user service (because that the requirement condition for the non-blocking mode is met indicates a low current credit control risk), and further generate CurCmd38. If determining to suspend the quota management, charging processing device does not grant the quota to the user service.

For example, the charging processing device learns that the current charging trigger device applies the blocking mode initial quota request for the user service. When determining that the user account meets a required condition for the non-blocking mode initial quota request (for example, meets a condition that "a remaining validity period of a tariff plan of the account is greater than a threshold", or meets that "a decrease rate of an account balance is less than a threshold), the charging processing device determines that the credit control risk is low, determines that the charging trigger device is to change to apply the non-blocking mode initial quota request for the user service, and further generates NxtCmd38.

For another example, the charging processing device may also directly generate NxtCmd38 when determining that the user account meets the required condition for the non-blocking mode, regardless of a specific mode initial quota request applied by the charging trigger device for the user service.

A value of NxtCmd38 is "ToNB" (to non-blocking mode), to indicate the charging trigger device to apply the non-blocking mode initial quota request for the user service when receiving the start request of the user service again.

Optionally, the charging processing device may perform charging processing on the user service based on a case indicated by IqrModInd35, including granting a quota GSU36 for RSU36 and determining in a quota granting process that the credit control risk of the user service is relatively low without performing online credit control on the current-stage user service. The charging processing device further generates CurCmd38 whose value is "HngQm", to indicate the charging trigger device to suspend the quota management for the current-stage user service. In this way, a performance burden on the charging processing device and the charging trigger device can be properly reduced to some extent, and after all, a quantity of times of information exchange between the charging processing device and the charging trigger device may be reduced.

For a process of recording or storing the currently effective initial quota request mode for the user service, refer to related descriptions in step 305-1.

Step 345: The charging processing device sends the initial charging response message to the charging trigger device, where the initial charging response message includes GSU36, CurCmd38, and NxtCmd38.

Herein, GSU36 and CurCmd38 are both optional.

Step 346: The charging trigger device starts the user service based on GSU36, suspends the quota management, and updates the initial quota request mode for the user service based on NxtCmd38.

Specifically, the charging trigger device receives and parses the initial charging response message in step 345-1, and obtains GSU36 (if exists), CurCmd38 (if exists), and NxtCmd38. If the response message carries GSU36, the charging trigger device starts the user service based on GSU36 and performs quota management. If the response message carries CurCmd38 and does not carry GSU36, the charging trigger device suspends the quota management for the user service based on CurCmd38. For a process in which the charging trigger device updates the initial quota request mode for the user service based on NxtCmd38, refer to related descriptions in step 307-1.

Step 347: The user service is ended.

For content of this step, refer to step 308.

Step 348: The charging trigger device receives a start request StartReq36 of the user service.

For content of this step, refer to step 321.

Step 349: The charging trigger device obtains an initial quota request mode IqrMod(=NB) of the user service.

For content of this step, refer to step 322.

Step 350: The charging trigger device starts the user service, and records a non-quota usage amount NQUSU.

For content of this step, refer to step 323.

Step 351: The charging trigger device sends an initial charging request to the charging processing device, where the initial charging request includes quota request information RSU37 and initial quota request mode indication information IqrModInd36.

For content of this step, refer to step 324.

Step 352: The charging processing device grants a quota GSU37, and stores IqrMod.

For content of this step, refer to step 325.

Step 353: The charging processing device sends an initial charging response message to the charging trigger device, where the initial charging response message includes the granted quota GSU37.

For content of this step, refer to step 326.

Step 354: The charging trigger device monitors use of GSU37 (where the NQUSU can be first deducted from GSU37).

For content of this step, refer to step 327.

In the foregoing steps 348 to 354, the initial quota request mode for the user service may be further changed. For details, refer to steps 301 to 307 in FIG. 3A-1 and FIG. 3A-2.

After step 354, the initial quota request mode for the user service may also be changed. For details, refer to steps 328 to 332 in FIG. 3B-1 and FIG. 3B-2.

In the process of steps 341 to 346, the user service is started after the quota is requested. Therefore, this is a blocking mode initial quota request. In step 348 to step 354, the user service is started before the quota is requested. Therefore, this is a non-blocking mode initial quota request. This sequence change is caused due to the charging control command delivered by the charging processing device.

In the method procedure corresponding to FIG. 3C, the charging processing device may adjust the initial quota request mode for the user service from the blocking mode to the non-blocking mode in a timely manner, to meet a requirement of a delay-sensitive service for an access delay in a timely manner. On this basis, in the method procedure, the charging processing device may further suspend the quota management in a timely manner, to reduce communication interaction and data processing between the charging trigger device and the charging processing device, thereby further reducing a performance burden on the charging trigger device and the charging processing device.

Figure 3D:
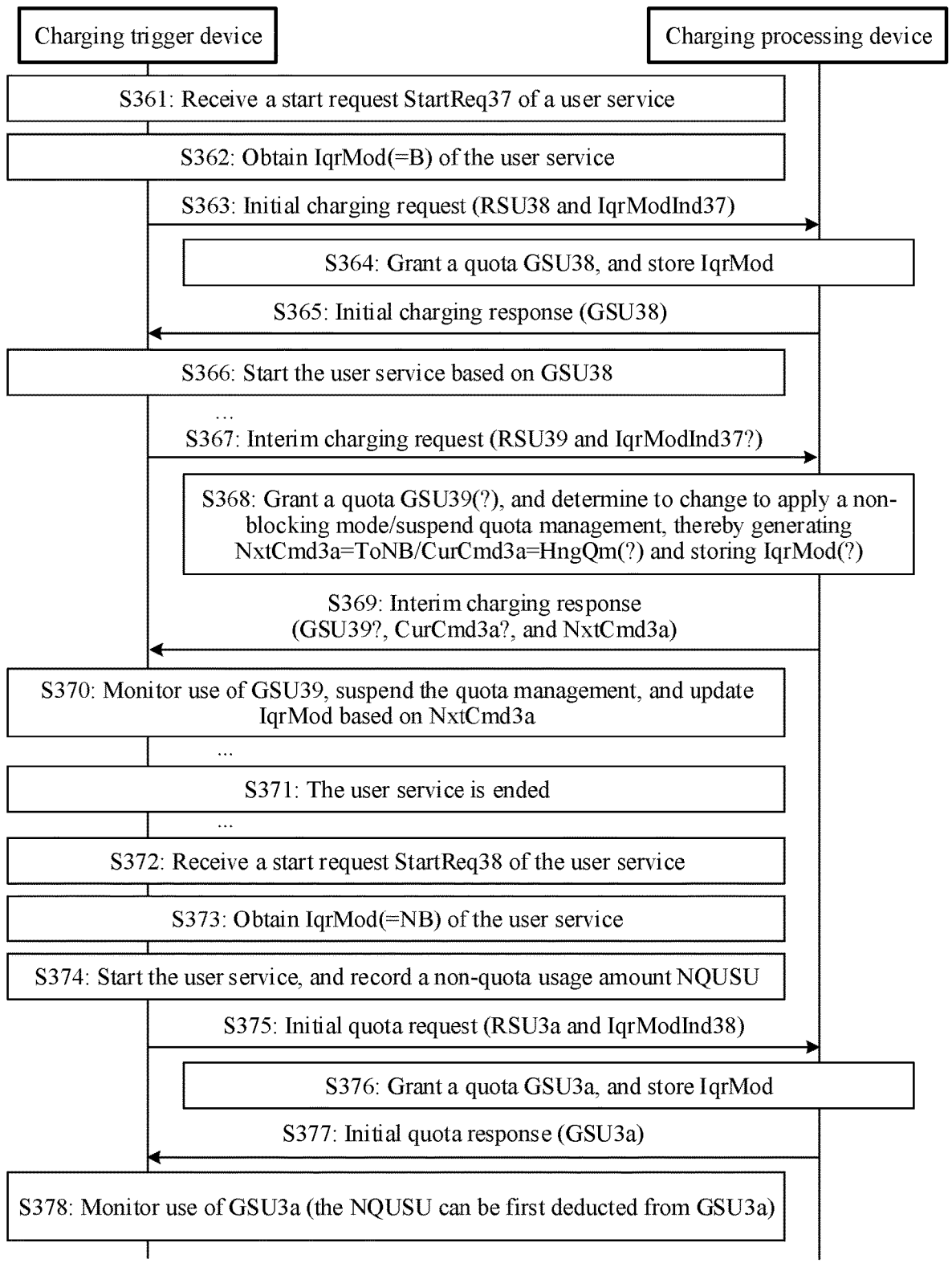
FIG. 3D is a second flowchart of a user service processing method performed by a charging processing device based on an interim charging response message according to an embodiment of this application.

In the method procedure corresponding to FIG. 3D, a charging trigger device initially applies a blocking mode (a first mode) initial quota request for a user service, and then a charging processing device sends a charging control command by using an interim charging response message, so that the charging trigger device adjusts a charging operation, for example, suspends quota management and changes to apply a non-blocking mode (a second mode) initial quota request for the user service. The method procedure mainly includes the following steps.

Step 361: The charging trigger device receives a start request StartReq37 of the user service.

For content of this step, refer to step 309.

Step 362: The charging trigger device obtains an initial quota request mode IqrMod(=B) of the user service.

For content of this step, refer to step 310.

Step 363: The charging trigger device sends an initial charging request message to the charging processing device, where the initial charging request message includes quota request information RSU38 and initial quota request mode indication information IqrModInd37.

For content of this step, refer to step 311.

Step 364: The charging processing device grants a quota GSU38, and stores the initial quota request mode for the user service.

Specifically, the charging processing device grants a corresponding quota GSU38 based on RSU38, and records or stores the initial quota request mode for the user service based on IqrModInd37. For details, refer to related descriptions in steps 305-1 and 305-2.

Step 365: The charging processing device sends an initial charging response message to the charging trigger device, where the initial charging response message includes GSU38.

For content of this step, refer to step 313.

Step 366: The charging trigger device starts the user service based on GSU38.

For content of this step, refer to step 314.

In this case, the user service is started. The charging trigger device may continue to request a quota from the charging processing device, to keep allowing the user service to pass. This is specifically shown in the following steps.

Step 367: The charging trigger device sends an interim charging request to the charging processing device, where the interim charging request includes quota request information RSU39 and the initial quota request mode indication information IqrModInd37. Herein, IqrModInd37 is optional.

When the interim charging request does not include IqrModInd37, the charging processing device may determine, based on the initial quota request mode recorded or stored in step 364, that the charging trigger device applies the blocking mode initial quota request for the user service.

The charging processing device receives and parses the interim charging request, obtains quota request information RSU39 and initial quota request mode indication information IqrModInd37 from the interim charging request, and further performs charging processing.

Step 368: The charging processing device grants a quota GSU39, and determines to change to apply a non-blocking mode/suspend quota management, thereby generating CurCmd3a=HngQm/NxtCmd3a=ToNB, and storing IqrMod.

For content of this step, refer to step 344.

Step 369: The charging processing device sends an interim charging response to the charging trigger device, where the interim charging response includes GSU39, CurCmd3a, and NxtCmd3a.

This step is similar to step 345. Except that the initial charging response in step 345 is replaced with the interim charging response in this step, for other details, refer to step 345.

Step 370: The charging trigger device continues the user service, suspends quota management for the user service, and updates the initial quota request mode for the user service based on NxtCmd3a.

Specifically, the charging trigger device receives and parses the interim charging response message described in step 369, and obtains GSU39 (if exists), CurCmd3a, and NxtCmd3a from the interim charging response message. If the response message carries GSU39, the charging trigger device monitors use of the granted quota GSU39 for the user service. If the response message carries CurCmd3a=HngQm but does not carry GSU39, the charging trigger device suspends quota management for the user service (for example, changes to offline charging). The charging trigger device updates the initial quota request mode for the user service based on NxtCmd3a=ToNB, so as to apply the non-blocking mode initial quota request for the user service when the charging trigger device receives a next start request of the user service.

Step 371: The user service is ended.

For content of this step, refer to step 308.

Step 372: The charging trigger device receives a start request StartReq38 of the user service.

For content of this step, refer to step 321.

Step 373: The charging trigger device obtains an initial quota request mode IqrMod(=NB) of the user service.

For content of this step, refer to step 322.

Step 374: The charging trigger device starts the user service, and records a non-quota usage amount NQUSU.

For content of this step, refer to step 323.

Step 375: The charging trigger device sends an initial charging request to the charging processing device, where the initial charging request includes quota request information RSU3a and initial quota request mode indication information IqrModInd38.

For content of this step, refer to step 324.

Step 376: The charging processing device grants a quota GSU3a, and stores IqrMod.

For content of this step, refer to step 325.

Step 377: The charging processing device sends an initial charging response message to the charging trigger device, where the initial charging response message includes the granted quota GSU3a.

For content of this step, refer to step 326.

Step 378: The charging trigger device monitors use of GSU3a (where the NQUSU can be first deducted from GSU3a).

For content of this step, refer to step 327.

In the foregoing steps 372 to 378, the initial quota request mode for the user service may be further changed. For details, refer to steps 301 to 307 in FIG. 3A-1 and FIG. 3A-2. After step 378, the initial quota request mode for the user service may also be changed. For details, refer to steps 328 to 332 in FIG. 3B-1 and FIG. 3B-2.

In comparison with the method procedure corresponding to FIG. 3C, the foregoing method procedure corresponding to FIG. 3D enables the charging processing device to have more determining opportunities, and balance a credit risk control requirement, a resource usage requirement, and an access delay requirement in a more timely manner.

In the foregoing method procedures corresponding to FIG. 3A-1 and FIG. 3A-2 to FIG. 3D, information such as an account balance, an account status, and an account use trend of the user service are obtained through charging processing on the user service. The charging control command is sent accordingly. Actually, when a plurality of user services correspond to the same user account (for example, one user subscribes for the plurality of user services from an operator), the information may be further obtained through charging processing of a "brother service" (or referred to as "another service", which indicates a service of an identical account corresponding to the user service), or the information may be even obtained based on a management message (for example, an account management message from a BSS system) of the corresponding account of the user service, and a charging control command is further sent to the charging trigger device based on the information. Therefore, embodiments of this application further provide method procedures corresponding to FIG. 4A-1 and FIG. 4A-2 and FIG. 4B. The following separately describes the method procedures.

Figures 1, 4A:
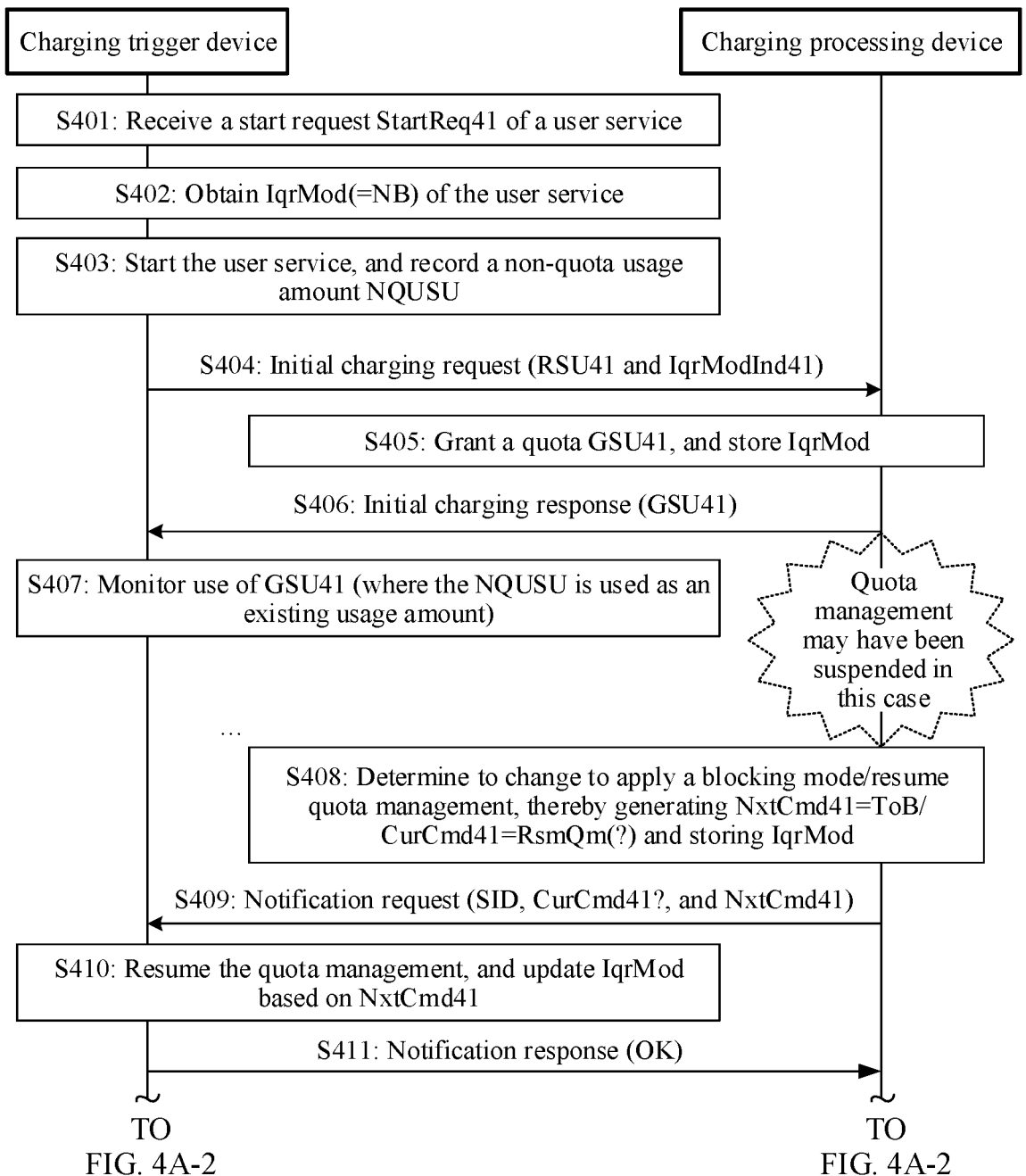
Figures 2, 4A:
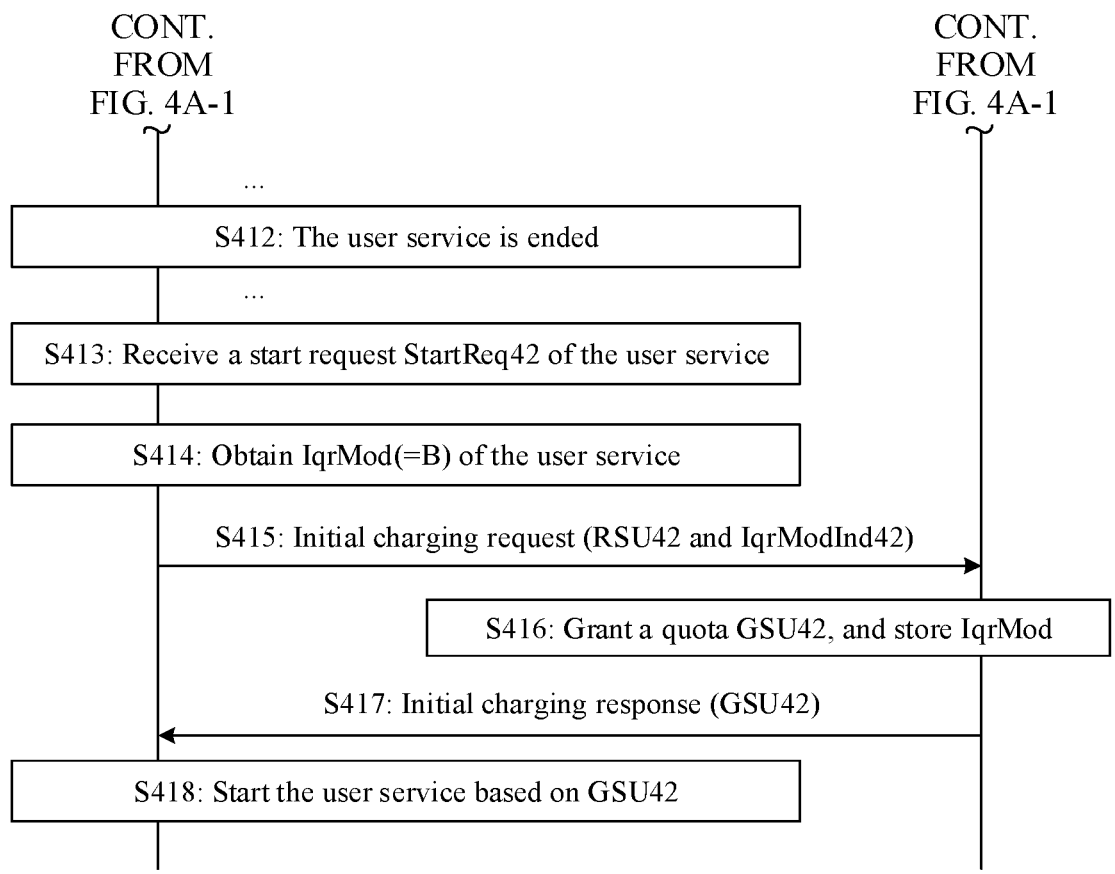

In the method procedure corresponding to FIG. 4A-1 and FIG. 4A-2, a charging trigger device initially applies a non-blocking mode (a first mode) initial quota request for a user service, and then a charging processing device sends a charging control command by using a charging notification message, so that the charging trigger device adjusts a charging operation, for example, resumes quota management for the user service and changes to apply a blocking mode (a second mode) initial quota request for the user service. The method procedure mainly includes the following steps.

Step 401: The charging trigger device receives a start request StartReq41 of the user service.

For content of this step, refer to step 321.

Step 402: The charging trigger device obtains an initial quota request mode IqrMod(=NB) of the user service.

For content of this step, refer to step 322.

Step 403: The charging trigger device starts the user service, and records a non-quota usage amount NQUSU.

For content of this step, refer to step 323.

Step 404: The charging trigger device sends an initial charging request to the charging processing device, where the initial charging request includes quota request information RSU41 and initial quota request mode indication information IqrModInd41.

For content of this step, refer to step 324.

Step 405: The charging processing device grants a quota GSU41, and stores IqrMod.

For content of this step, refer to step 325.

Step 406: The charging processing device sends an initial charging response message to the charging trigger device, where the initial charging response message includes the granted quota GSU41.

For content of this step, refer to step 326.

Step 407: The charging trigger device monitors use of GSU41 (where the NQUSU is used as an existing usage amount of the quota).

For content of this step, refer to step 327.

Afterwards, the charging processing device continuously grants a quota for the user service (based on the charging request sent by the charging trigger device), so that the user service is continuously allowed to pass. In addition, the charging processing device may further perform charging processing on another user service. The another user service corresponds to an identical account as the user service. The charging processing device may further receive a change event of attribute information of the user service (for example, a change of a tariff plan on the user service and a decrease of a user level). In this case, the charging processing device may also send a charging control command to the charging trigger device based on a charging processing result of the another user service, a change event of the attribute information of the user service, and the like, to adjust a charging operation of the charging trigger device on the user service, for example, resume quota management for the user service and change to apply the blocking mode initial quota request.

Step 408: The charging processing device determines that the blocking mode initial quota request is to be applied/the quota request of the user service is to be resumed, generates a next-stage charging control command NxtCmd41=ToB/a current-stage charging control command CurCmd41=RsmQm, and stores the initial quota request mode IqrMod of the user service.

Specifically, the charging processing device determines that the charging trigger device is to change to apply the blocking mode quota management for the user service, and further generates the next-stage charging control command NxtCmd41 whose value is "ToB". On this basis, optionally, the charging processing device may further generate the current-stage charging control command CurCmd41 whose value is "RsmQm". Optionally, the charging processing device may further store/update the initial quota request mode indication information based on a generation status of NxtCmd41.

Specifically, the charging processing device determines, based on the previously stored initial quota request mode for the user service, that the charging trigger device applies the non-blocking mode initial quota request for the user service, finds, based on a charging processing result of the charging request message for the "brother service" or the "another user service" or based on processing of an account management message (for example, an account management message from a business support system (BSS)) of the user service, that a required condition for the non-blocking mode for the user service is not met, and therefore generates NxtCmd41. A case in which the required condition for the non-blocking mode is not met is not limited in this embodiment of this application. For example, the charging processing result of the another user service indicates that an account of the user service (also an account corresponding to the another user service) no longer meets a required condition for the non-blocking mode initial quota request. For another example, an event received by the charging processing device indicates that a user level corresponding to the user service decreases.

Optionally, the charging processing device finds that the quota management for the user service is suspended (which indicates that offline charging may be applied or unlimited quota management may be applied). In this case, if the account of the user service (also the account corresponding to the another user service) no longer meets the required condition for the non-blocking mode initial quota request, it indicates that a credit control risk becomes high. To reduce the credit control risk, CurCmd41 whose value is "RsmQm" may be further generated to indicate the charging trigger device to resume the quota management for the user service in a timely manner.

For a process of storing/updating the initial quota request mode for the user service, refer to related descriptions in step 305-1.

Step 409: The charging processing device sends a notification request to the charging trigger device, where the notification request includes CurCmd41 and NxtCmd41.

Specifically, to send the charging control command generated in step 408-1 to the charging trigger device in a more timely manner, the charging processing device generates a notification request message. The notification request message includes CurCmd41 and NxtCmd41. The charging processing device sends the notification request message to the charging trigger device. Herein, CurCmd41 is optional. A notification address (NotifyURL) of the notification request message may be used to identify the charging trigger device and the user service. If the user service is a data service, the notification request message may further carry an identifier of a rating group RG in which the user service is located.

Step 410: The charging trigger device resumes the quota management, and changes the initial quota request mode for the user service based on NxtCmd41.

Specifically, the charging trigger device receives and parses the notification request message, and obtains CurCmd41 and NxtCmd41 from the notification request message. On this basis, the charging trigger device performs CurCmd41 and NxtCmd41 on the user service. Specifically, the charging trigger device resumes the quota management for the user service (which indicates that the charging trigger device starts to request a quota from the charging processing device for the user service again), and changes the initial quota request mode (where for example, a new initial quota request mode may be stored locally in the charging trigger device, or may be stored in an external storage device, or may be sent to a policy control device, where reference may be made to step 307-1 for details) of the user service based on NxtCmd41, so as to apply the blocking mode initial quota request for the user service when the charging trigger device receives a next start request of the user service.

Step 411: The charging trigger device returns a notification response message to the charging processing device.

Specifically, the charging trigger device returns a notification response message to the charging processing device based on the processing result in step 410. The notification response message includes information indicating that the notification request in step 409 is successfully processed.

Step 412: The user service is ended.

For content of this step, refer to step 308.

Step 413: The charging trigger device receives a start request StartReq42 of the user service.

For content of this step, refer to step 333.

Step 414: The charging trigger device obtains an initial quota request mode IqrMod(=B) of the user service.

For content of this step, refer to step 334.

Step 415: The charging trigger device sends an initial charging request to the charging processing device, where the initial charging request includes quota request information RSU32 and initial quota request mode indication information IqrModInd42.

For content of this step, refer to step 335.

Step 416: The charging processing device grants a quota GSU42, and stores IqrMod.

For content of this step, refer to step 336.

Step 417: The charging processing device sends an initial charging response message to the charging trigger device, where the initial charging response message includes GSU42.

For content of this step, refer to step 337.

Step 418: The charging trigger device starts the user service based on GSU42.

For content of this step, refer to step 338.

In the foregoing steps 413 to 418, the initial quota request mode for the user service may be further changed. For details, refer to steps 341 to 346 in FIG. 3C. After step 418, the initial quota request mode for the user service may also be changed. For details, refer to steps 367 to 370 in FIG. 3D.

In comparison with the foregoing method procedures corresponding to FIG. 3A-1 and FIG. 3A-2 and FIG. 3B-1 and FIG. 3B-2, the foregoing method procedure corresponding to FIG. 4A-1 and FIG. 4A-2 may further increase an opportunity for the charging processing device to find a risk and make a decision, and expand context of charging processing performed on a user service to context of charging processing performed on other user services, and even to context of processing performed on a management message of an operation support system.

Figure 4B:
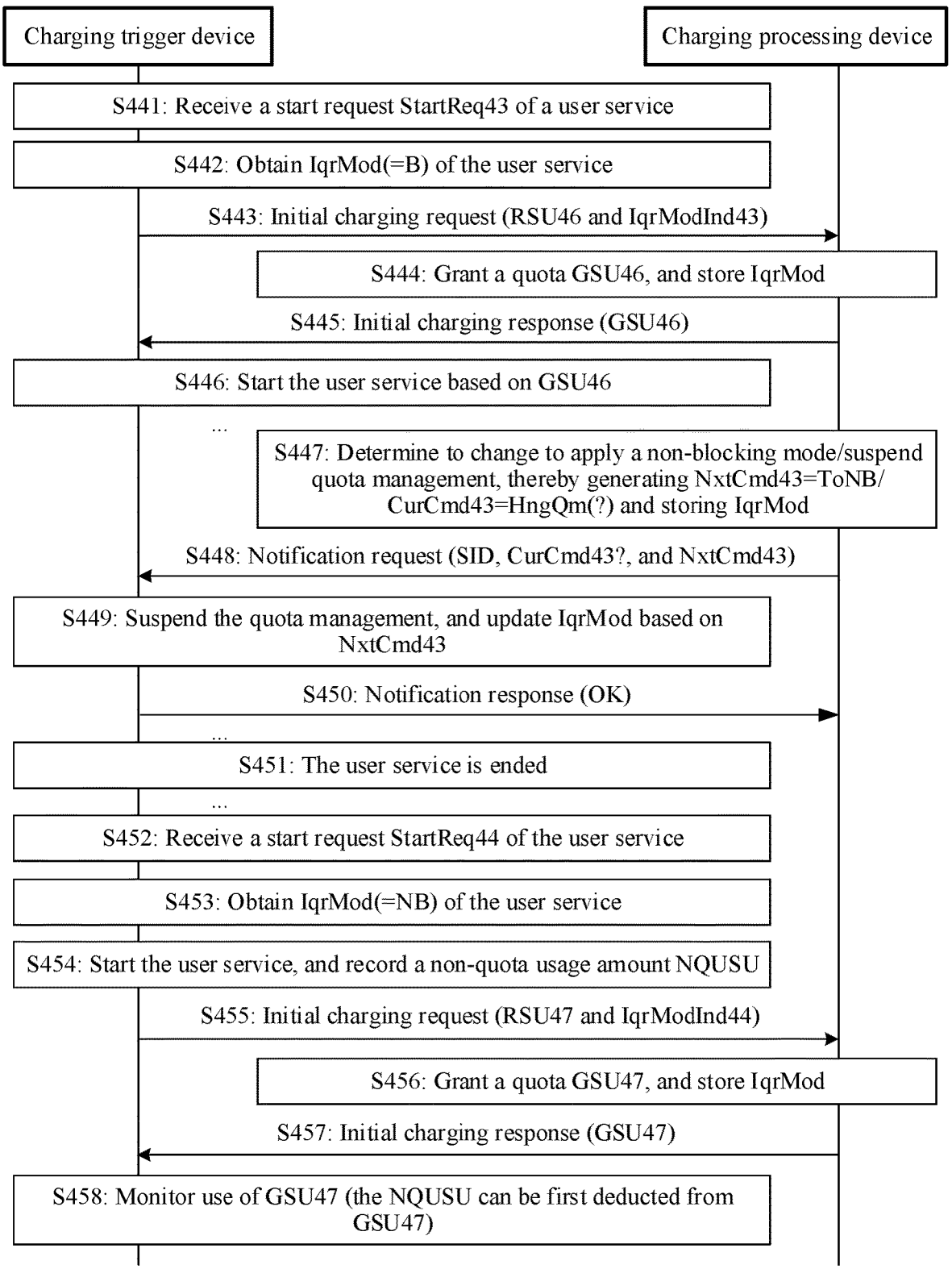
FIG. 4B is a second flowchart of a user service processing method performed by a charging processing device based on a notification message according to an embodiment of this application.

In the method procedure corresponding to FIG. 4B, a charging trigger device initially applies a blocking mode (a first mode) initial quota request for a user service, and then a charging processing device sends a charging control command by using a charging notification message, so that the charging trigger device adjusts a charging operation, for example, suspends quota management for the user service and turns to apply a non-blocking mode (a second mode) initial quota request for the user service. The method procedure mainly includes the following steps.

Step 441: The charging trigger device receives a start request StartReq43 of the user service.

For content of this step, refer to step 309.

Step 442: The charging trigger device obtains an initial quota request mode IqrMod(=B) of the user service.

For content of this step, refer to step 310.

Step 443: The charging trigger device sends an initial charging request message to the charging processing device, where the initial charging request message includes quota request information RSU46 and the initial quota request mode indication information IqrModInd43.

For content of this step, refer to step 311.

Step 444: The charging processing device grants a quota GSU46, and stores IqrMod.

Specifically, the charging processing device grants a corresponding quota GSU46 based on quota request information RSU46, and records or stores the initial quota request mode IqrMod of the user service based on IqrModInd43. For details, refer to related descriptions in step 305-1.

Step 445: The charging processing device sends an initial charging response message to the charging trigger device, where the initial charging response message includes GSU46.

For content of this step, refer to step 313.

Step 446: The charging trigger device starts the user service based on GSU46.

For content of this step, refer to step 314.

Afterwards, the charging processing device continuously grants a quota to the user service (based on the charging request sent by the charging trigger device), so that the user is continuously allowed to pass. In addition, the charging processing device may further perform charging processing on another user service. The another user service corresponds to an identical account as the user service. The charging processing device may further receive a change event of attribute information of the user service (for example, a change of a tariff plan on the user service: a delay, an increase of a user level, and an account recharge). In this case, the charging processing device may also send a charging control command to the charging trigger device based on a charging processing result of the another user service, a change event of the attribute information of the user service, and the like, to adjust a charging operation of the charging trigger device on the user service, for example, suspend quota management for the user service and change to apply the non-blocking mode initial quota request.

Step 447: The charging processing device determines that the non-blocking mode is to be applied/the quota management is to be suspended, thereby generating a next-stage charging control command NxtCmd43=ToNB/a current-stage charging control command CurCmd43=HngQm and storing IqrMod.

Specifically, the charging processing device determines that the charging trigger device is to change to apply the non-blocking mode quota management for the user service, and further generates the next-stage charging control command NxtCmd43 whose value is "ToNB". On this basis, optionally, the charging processing device may further generate the current-stage charging control command CurCmd43 whose value is "HngQm". Optionally, the charging processing device may further store/update the initial quota request mode indication information based on a generation status of NxtCmd43.

Specifically, the charging processing device determines, based on the previously stored initial quota request mode for the user service, that the charging trigger device applies the blocking mode initial quota request for the user service. In this case, the charging processing device finds that the required condition for the non-blocking mode is met, and therefore generates NxtCmd43 whose value is "ToNB". A case in which the required condition for the non-blocking mode is met is not limited in this embodiment of this application. For example, the charging processing result of the another user service indicates that an account of the user service (also an account corresponding to the another user service) meets a required condition for the blocking mode initial quota request. For another example, an event received by the charging processing device indicates that a user level corresponding to the user service increases.

In addition, if the account of the user service (also the account corresponding to the another user service) meets the required condition for the non-blocking mode initial quota request in this case, it indicates that the credit control risk is reduced. To reduce a system burden, CurCmd43 whose value is "HngQm" may be further generated, to indicate the charging trigger device to suspend quota management for the user service in a timely manner.

For storing/updating the initial quota request mode, refer to related descriptions in step 305-1.

Step 448: The charging processing device sends a notification request to the charging trigger device, where the notification request includes CurCmd43 and NxtCmd43.

For content of this step, refer to step 409-1.

Step 449: The charging trigger device suspends the quota management, and changes the initial quota request mode for the user service based on NxtCmd43.

Specifically, the charging trigger device receives and parses the notification request message, and obtains CurCmd43 and NxtCmd43 from the notification request message. On this basis, the charging trigger device performs CurCmd43 and NxtCmd43 on the user service. Specifically, the charging trigger device suspends the quota management for the user service (offline charging indicates that the charging trigger device no longer requests a quota from the charging processing device for the user service, and an unlimited quota indicates that the charging trigger device requests, based on an accumulated usage amount, a quota with the same amount from the charging processing device), and changes the initial quota request mode (where for example, a new initial quota request mode may be stored locally in the charging trigger device, or may be stored in an external storage device, or may be sent to the policy control device, where reference may be made to step 307-1 for details) of the user service based on NxtCmd43, so as to apply the non-blocking mode initial quota request for the user service when the charging trigger device receives a next start request of the user service.

Step 450: The charging trigger device returns a notification response message to the charging processing device.

Specifically, the charging trigger device returns a notification response message to the charging processing device based on the processing result in step 449. The notification response message includes information indicating that the notification request in step 448 is successfully processed.

Step 451: The user service is ended.

For content of this step, refer to step 308.

Step 452: The charging trigger device receives a start request StartReq44 of the user service.

For content of this step, refer to step 321.

Step 453: The charging trigger device obtains an initial quota request mode IqrMod(=NB) for the user service.

For content of this step, refer to step 322.

Step 454: The charging trigger device starts the user service, and records a non-quota usage amount NQUSU.

For content of this step, refer to step 323.

Step 455: The charging trigger device sends an initial charging request to the charging processing device, where the initial charging request includes quota request information RSU47 and initial quota request mode indication information IqrModInd44, and IqrModInd44 indicates the charging trigger device to apply the non-blocking mode initial quota request for the user service.

For content of this step, refer to step 324.

Step 456: The charging processing device grants a quota GSU47, and stores IqrMod.

For content of this step, refer to step 325.

Step 457: The charging processing device sends an initial charging response message to the charging trigger device, where the initial charging response message includes the granted quota GSU47.

For content of this step, refer to step 326.

Step 458: The charging trigger device monitors use of GSU47 (where the NQUSU can be first deducted from GSU47).

For content of this step, refer to step 327.

In the foregoing steps 452 to 458, the initial quota request mode for the user service may be further changed. For details, refer to steps 341 to 346 in FIG. 3C. After step 458, the initial quota request mode for the user service may also be changed. For details, refer to steps 367 to 370 in FIG. 3D.

In comparison with the foregoing method procedures corresponding to FIG. 3C and FIG. 3D, the foregoing method procedure corresponding to FIG. 4B may further increase an opportunity for the charging processing device to find a low risk and reduce the access delay of the user service, and expand context of charging processing performed on a user service to context of charging processing performed on other user services, and even to context of processing performed on a management message of an operation support system.

In the foregoing method procedures corresponding to FIG. 3A-1 and FIG. 3A-2 to FIG. 3D and FIG. 4A-1 and FIG. 4A-2 and FIG. 4B, the charging processing device serves as a controlling party, and the charging trigger device serves as a controlled party. However, for switching or changing the initial quota request mode, the charging trigger device may also participate in decision making based on a result returned by the charging processing device. Therefore, embodiments of this application further provide method procedures corresponding to FIG. 5A-1 and FIG. 5A-2 and FIG. 5B-1 and FIG. 5B-2. The following separately describes the method procedures.

Figures 1, 5A:
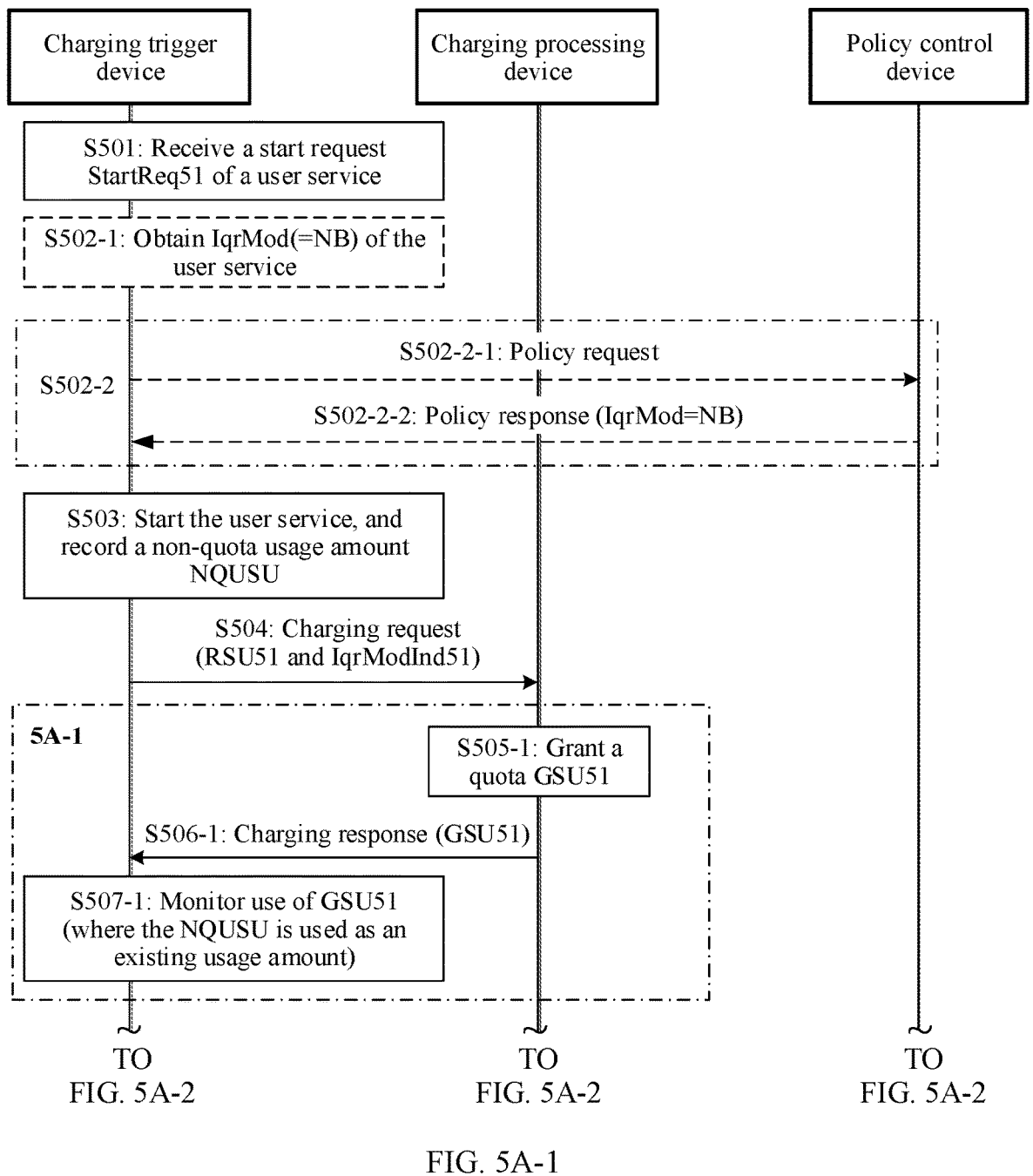
Figures 2, 5A:
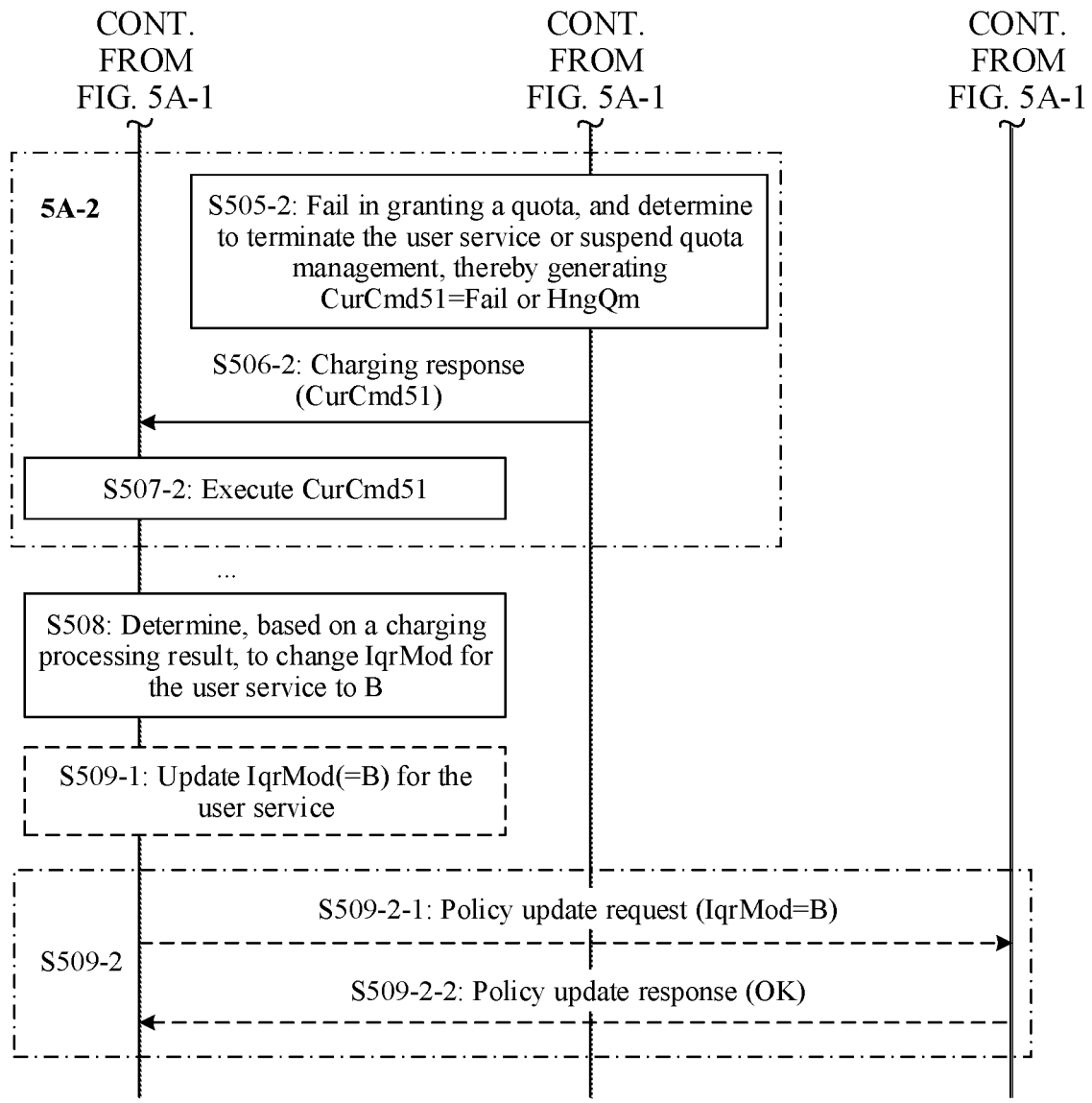

In the method procedure corresponding to FIG. 5A-1 and FIG. 5A-2, a charging trigger device initially applies a non-blocking mode (a first mode) initial quota request for a user service, and then a charging processing device accordingly controls the charging trigger device to perform a charging operation on a current-stage user service. The charging trigger device changes, based on a charging processing result returned by the charging processing device, to apply a blocking mode (a second mode) initial quota request for the user service. The method procedure mainly includes the following steps.

Step 501: The charging trigger device receives a start request StartReq51 of the user service.

For content of this step, refer to step 301.

To determine a time sequence of starting the user service and requesting a quota for the user service, as shown in step 502-1 or step 502-2, the charging trigger device first obtains an initial quota request mode for the user service.

Step 502-1: The charging trigger device obtains the initial quota request mode IqrMod(=NB) for the user service.

Specifically, the charging trigger device may obtain the initial quota request mode for the user service based on configuration information that is of the user service and that is stored locally in the charging trigger device or in an external storage device, or obtain the non-blocking mode initial quota request for the user service from a charging policy that is of the user service and that is activated by a policy control device, to determine that the non-blocking mode initial quota request is to be applied for the user service.

Go to step 503.

Step 502-2:

If the charging trigger device does not have a charging policy of the user service, the charging trigger device may request the charging policy of the user service from the policy control device.

Step 502-2-1: The charging trigger device sends a policy request message to the policy control device.

The policy request message includes information that may be used to identify the user service, for example, a user identifier and PDU session information.

Step 502-2-2: The policy control device returns a policy response message to the charging trigger device, where the policy response message includes the initial quota request mode for the user service.

Specifically, the policy control device returns a charging policy, where the charging policy includes the initial quota request mode for the user service.

Therefore, the charging trigger device may receive and parse the policy response message, and obtain the initial quota request mode for the user service from the policy response message, to determine that the non-blocking mode initial quota request is to be applied for the user service.

Step 503: The charging trigger device starts the user service, and records a non-quota usage amount NQUSU.

Specifically, because the charging trigger device previously determines that the non-blocking mode initial quota request is to be applied for the user service, the charging trigger device immediately starts the user service (without waiting for a quota granted by the charging processing device), and starts to record the non-quota usage amount NQUSU.

Step 504: The charging trigger device sends a charging request message to the charging processing device, where the charging request message includes quota request information RSU51 and initial quota request mode indication information IqrModInd51.

Specifically, after the user service is started, the charging trigger device sends the charging request message to the charging processing device to keep allowing the user service to pass. The charging request message may be an initial charging request message, or may be an interim charging request message. When the charging request message is the initial charging request message, the charging request message includes the quota request information RSU51 and the initial quota request mode indication information IqrModInd51. When the charging request message is an interim charging request message, the charging request message includes the quota request information RSU51, and optionally, may further include IqrModInd51. Herein, IqrModInd51 indicates the charging trigger device to apply the non-blocking mode initial quota request for the user service.

The charging processing device receives and parses the charging request message, obtains the quota request information RSU51 and the initial quota request mode indication information IqrModInd51 (if appears) from the charging request message. A subsequent processing process is shown in Example 5A-1 or Example 5A-2.

Example 5A-1

Step 505-1: The charging processing device grants a quota GSU51.

Specifically, the charging processing device grants a quota GSU51 to the user service based on the quota request information RSU51.

Step 506-1: The charging processing device sends a charging response message to the charging trigger device, where the charging response message includes GSU51.

Correspondingly, the charging response message may be an initial charging response message, or may be an interim charging response message.

Step 507-1: The charging trigger device monitors use of GSU51 (where the NQUSU is used as an existing usage amount of the quota).

Step 505-1 to step 507-1 are a process of successful quota granting. The granted quota may be used as a basis for the charging trigger device determining to change the initial quota request mode. For details, refer to step 508.

Go to step 508.

Example 5A-2

Step 505-2: The charging processing device fails in granting a quota to the user service, and determines that the user service is to be terminated/the quota management for the user service is to be suspended, thereby generating CurCmd51=Fail or HngQm.

Specifically, the charging processing device fails in granting a quota to the user service. For example, the charging processing device determines, based on the quota request information RSU51, that a condition for granting a quota is not met (for example, the balance is less than a requested quota amount in the quota request information RSU51), fails in granting a quota, further determines that the user service is to be terminated or the quota management for the user service is to be suspended, and generates a current-stage service control command CurCmd51 whose value is "Fail" or "HngQm".

For example, the charging processing device generates CurCmd51 based on attribute information of the user service, for example, service interruptibility. If learning that the user service is an interruptible service, the charging processing device generates CurCmd51 whose value is "HngQm". If learning that the user service is an interruptible service, the charging processing device generates CurCmd51 whose value is "Fail".

Step 506-2: The charging processing device sends a charging response message to the charging trigger device, where the charging response message includes CurCmd51.

Correspondingly, the charging response message may be an initial charging response message, or may be an interim charging response message.

Step 507-2: The charging trigger device performs CurCmd51.

Specifically, if a value of CurCmd51 is "Fail", the charging trigger device terminates the user service; or if a value of CurCmd is "HngQm", the charging trigger device suspends the quota management for the user service, for example, changes from an online charging mode to an offline charging mode for the user service while still allowing the user service to pass.

Step 505-2 to step 507-2 are a quota granting failure process. The delivered control command may be used as a basis for the charging trigger device determining to change the initial quota request mode. For details, refer to step 508.

Step 508: The charging trigger device determines based on the charging processing result that the initial quota request mode for the user service is to be changed to the blocking mode.

Specifically, the charging trigger device determines, based on the charging processing process of Example 5A-1 or Example 5A-2, that the initial quota request mode for the user service is to be changed, that is, changed from the previous non-blocking mode (NB) to the blocking mode (B).

For example, the charging trigger device may determine, based on a downward trend of granted quota amounts in a plurality of consecutive charging processing results, that the charging processing device tightens credit control, and further determine that the initial quota request mode for the user service is to be changed to the blocking mode. For another example, the charging trigger device determines, based on a quota granting failure reason and/or a quantity of failure times of granting a quota, that a credit control risk of the user service is increased, and the blocking mode initial quota request is to be subsequently applied.

After determining to change the initial quota request mode, as shown in step 509-1 or step 509-2, the charging trigger device may store a new initial quota request mode for the user service.

Step 509-1: The charging trigger device updates an initial quota request mode for the user service.

Specifically, the charging trigger device stores the initial quota request mode in the configuration information that is of the user service and that is stored locally in the charging trigger device or in the external storage device. The initial quota request mode stored in the external storage device may be shared by a plurality of charging trigger devices.

Step 509-2

Step 509-2-1: The charging trigger device sends a policy update request message to the policy control device, where the policy update request message includes indication information for updating the initial quota request mode for the user service.

Specifically, after updating the locally effective initial quota request mode in the charging policy of the user service, the charging trigger device further sends a policy update request to the policy control device. The policy update request includes indication information for updating the initial quota request mode for the user service, so that the policy control device subsequently generates the charging policy of the user service based on the initial quota request mode. Alternatively, the locally effective initial quota request mode in the charging policy of the user service is not updated, and a policy update request is directly sent to the policy control device. The update request includes indication information for updating the initial quota request mode for the user service. Then, the policy control device delivers a new charging policy of the user service in a response message of the policy update request. The new charging policy includes the updated initial quota request mode for the user service. The indication information may indicate to disable the non-blocking mode so that the non-blocking mode is prevented from being applied for the user service, or indicate to apply the blocking mode for the user service.

An example of sending the policy update request message to the policy control device is as follows:

---

SMPolicyControl_UpdateRequest{
  "ChargingRule"{
    "ruleID":1; //rating group
    "BlockStatus":"disabled"; //the current non-blocking mode
is disabled (which may be a result of a process in which the charging processing device indicates the charging trigger device to disable the non-blocking mode, or a result of determining by the charging trigger device)
  }
}

---

An example of delivering the policy message of the user service again in the response message of the policy update request is as follows:

---

SMPolicyControl_UpdateResponse{
  "ChargingRule"{
    "ChargingRuleID":2;

"ChargingMethod":"online";
    "RatingGroup":1;
    "ServiceID":2;
    "sdfHandl":"false"; //a current mode for the user service
is the blocking mode
  }
}

---

Step 509-2-2: The policy control device returns a policy update response message (OK) to the charging trigger device.

In comparison with FIG. 3A-1 and FIG. 3A-2 to FIG. 3D and FIG. 4A-1 and FIG. 4A-2 and FIG. 4B, the method procedure corresponding to FIG. 5A-1 and FIG. 5A-2 may further reduce a performance burden on the charging processing device based on the foregoing figures.

Figures 1, 5B:
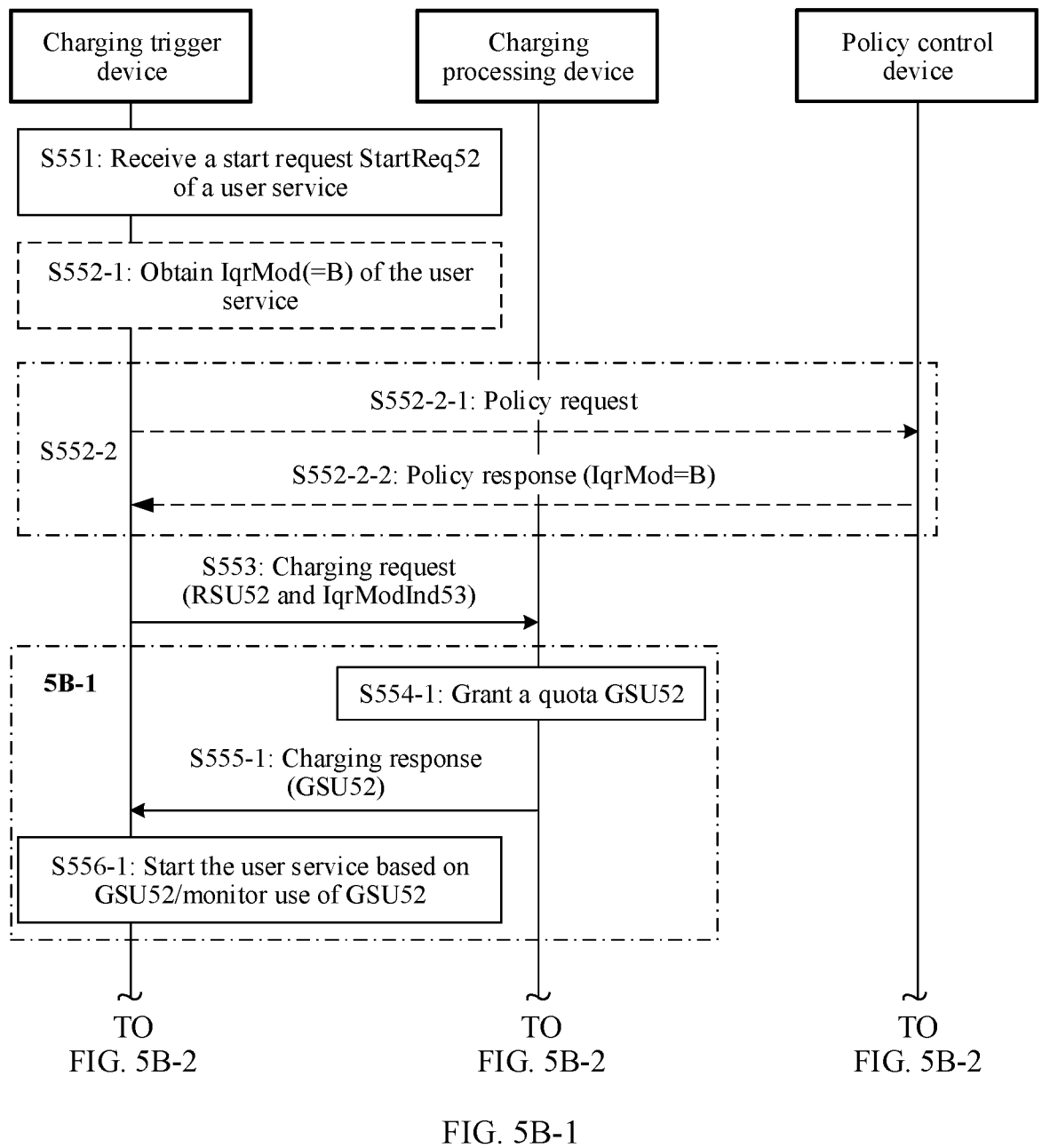
Figures 2, 5B:
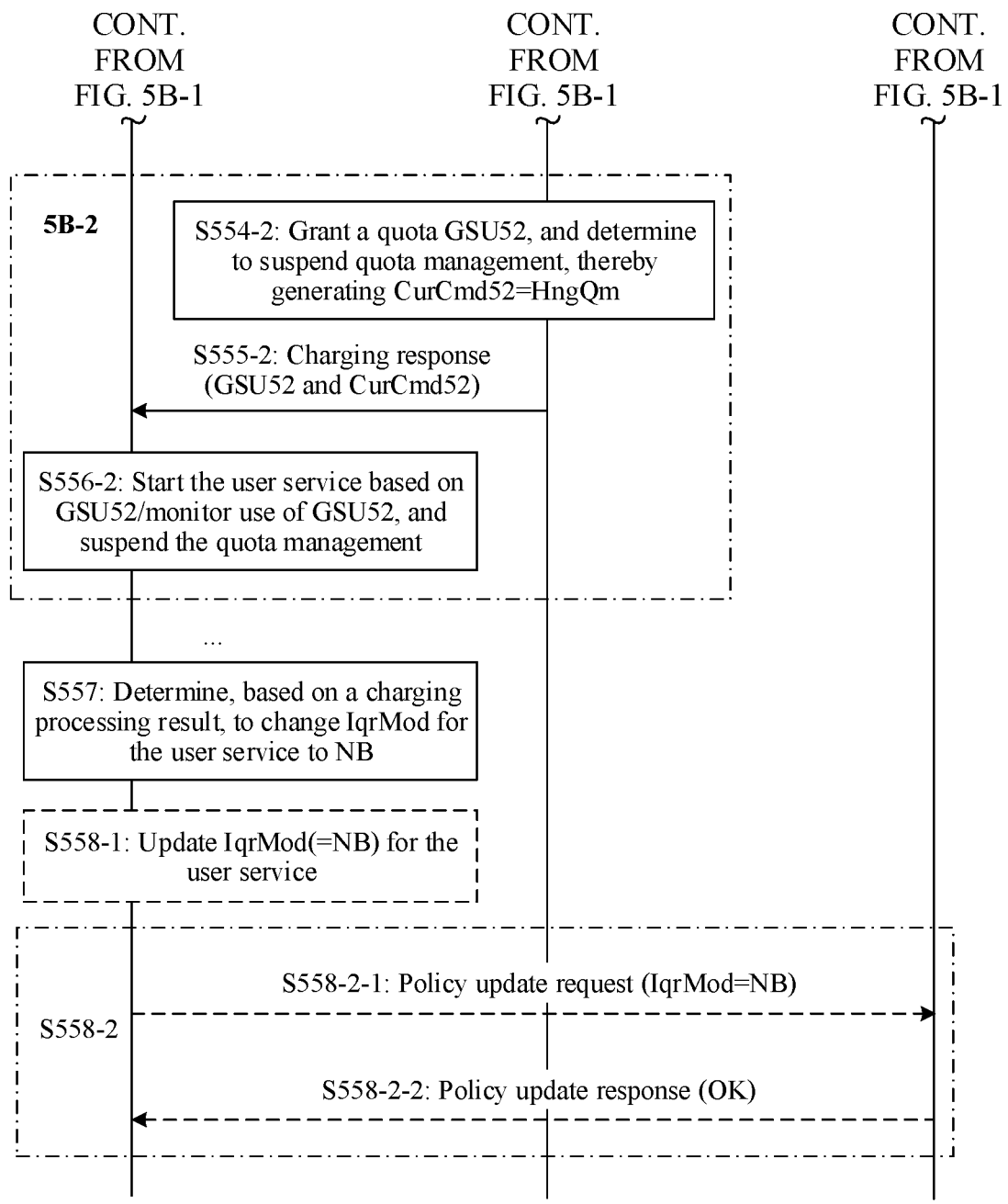

In the method procedure corresponding to FIG. 5B-1 and FIG. 5B-2, a charging trigger device initially applies a blocking mode (a first mode) initial quota request for a user service, and then a charging processing device accordingly performs charging processing and delivers a charging processing result to control the charging trigger device to perform a charging operation on the current-stage user service. The charging trigger device changes, based on the charging processing result returned by the charging processing device, to apply a non-blocking mode (a second mode) initial quota request for the user service. The method procedure mainly includes the following steps.

Step 551: The charging trigger device receives a start request StartReq52 of the user service.

For content of this step, refer to step 301.

To determine a time sequence of starting the user service and requesting a quota for the user service, as shown in step 552-1 or step 552-2, the charging trigger device first obtains an initial quota request mode for the user service.

Step 552-1: The charging trigger device obtains an initial quota request mode IqrMod(=B) of the user service.

For content of this step, refer to step 502-1. Different from this step, the initial quota request mode for the user service is a blocking mode.

Go to step 553.

Step 552-2

Step 552-2-1: The charging trigger device sends a policy request message to the policy control device.

For content of this step, refer to step 502-2-1.

Step 552-2-2: The policy control device returns a policy response message to the charging trigger device, where the policy response message includes the initial quota request mode for the user service.

For content of this step, refer to step 502-2-2.

Step 553: The charging trigger device sends a charging request message to the charging processing device, where the charging request message includes quota request information RSU52 and initial quota request mode indication information IqrModInd53.

The charging request message may be an initial charging request message, or may be an interim charging request message. Specifically, after the user service is started, the charging trigger device sends the initial charging request message to the charging processing device. The initial charging request message includes the quota request information RSU52 and the initial quota request mode indication information IqrModInd53. After the user service is started, to keep allowing the user service to pass, the charging trigger device sends the interim charging request message to the charging processing device. The interim charging request message includes the quota request information RSU52, and may optionally further include IqrModInd53. Herein, IqrModInd53 indicates the charging trigger device to apply the blocking mode initial quota request for the user service.

The charging processing device receives and parses the charging request message, obtains the quota request information RSU52 and the initial quota request mode indication information IqrModInd53 (if appears) from the charging request message. A subsequent processing process is shown in Example 5B-1 or Example 5B-2.

Example 5B-1

Step 554-1: The charging processing device grants a quota GSU52.

Specifically, the charging processing device grants a quota GSU52 to the user service based on the quota request information RSU52.

Step 555-1: The charging processing device sends a charging response message to the charging trigger device, where the charging response message includes GSU52.

Step 556-1: The charging trigger device starts the user service based on GSU52, or monitors use of GSU52.

Specifically, if the charging response message is an initial charging response message, the charging trigger device starts the user service based on GSU52. If the charging response message is an interim charging response message, the charging trigger device monitors use of GSU52.

Step 554-1 to step 556-1 are a process of normally granting a quota. The granted quota may be used as a basis for the charging trigger device determining to change the initial quota request mode. For details, refer to step 557.

Go to step 557.

Example 5B-2

Step 554-2: The charging processing device successfully grants a quota, and determines to suspend quota management, thereby generating CurCmd=HngQm.

In comparison with step 554-1, in addition to granting the quota GSU52, the charging processing device further generates CurCmd52=HngQm based on factors such as a performance burden on the charging system, so that the charging trigger device suspends quota management for the user service.

Step 555-2: The charging processing device sends a charging response message to the charging trigger device, where the charging response message includes GSU52 and CurCmd52.

In comparison with step 555-1, the charging response message further includes CurCmd52.

Step 556-2: The charging trigger device performs CurCmd52.

In comparison with step 506-2, the charging trigger device further suspends the quota management for the user service based on CurCmd52=HngQm.

Step 554-1 to step 556-1 are a process of normally granting a quota. The granted quota and the delivered charging control command (CurCmd52) may be used as a basis for the charging trigger device determining to change the initial quota request mode. For details, refer to step 557.

Step 557: The charging trigger device determines based on the charging processing result that the initial quota request mode for the user service is to be changed to the non-blocking mode.

Specifically, the charging trigger device determines, based on the charging processing process of Example 5B-1 or Example 5B-2, that the initial quota request mode for the user service is to be changed, that is, changed from the previous blocking mode (B) to the non-blocking mode (NB). For example, the charging trigger device may determine, based on an upward trend of granted quota amounts in a plurality of continuous charging processing results, that the charging processing device relaxes credit control, and further determine to change the initial quota request mode for the user service to the non-blocking mode.

After determining to change the initial quota request mode, as shown in step 558-1 or step 558-2, the charging trigger device may store a new initial quota request mode for the user service.

Step 558-1: The charging trigger device updates an initial quota request mode for the user service.

For content of this step, refer to step 509-1.

Step 558-2

Step 558-2-1: The charging trigger device sends a policy update request message to the policy control device, where the policy update request message includes indication information for updating the initial quota request mode for the user service.

For content of this step, refer to step 509-2-1.

Step 558-2-2: The policy control device returns a policy update response message (OK) to the charging trigger device.

For content of this step, refer to step 509-2-2.

In comparison with the method procedures corresponding to FIG. 3A-1 and FIG. 3A-2 to FIG. 3D and FIG. 4A-1 and FIG. 4A-2 and FIG. 4B, the method procedure corresponding to FIG. 5B-1 and FIG. 5B-2 may further reduce a performance burden on the charging processing device based on the foregoing method procedures.

Figure 6:
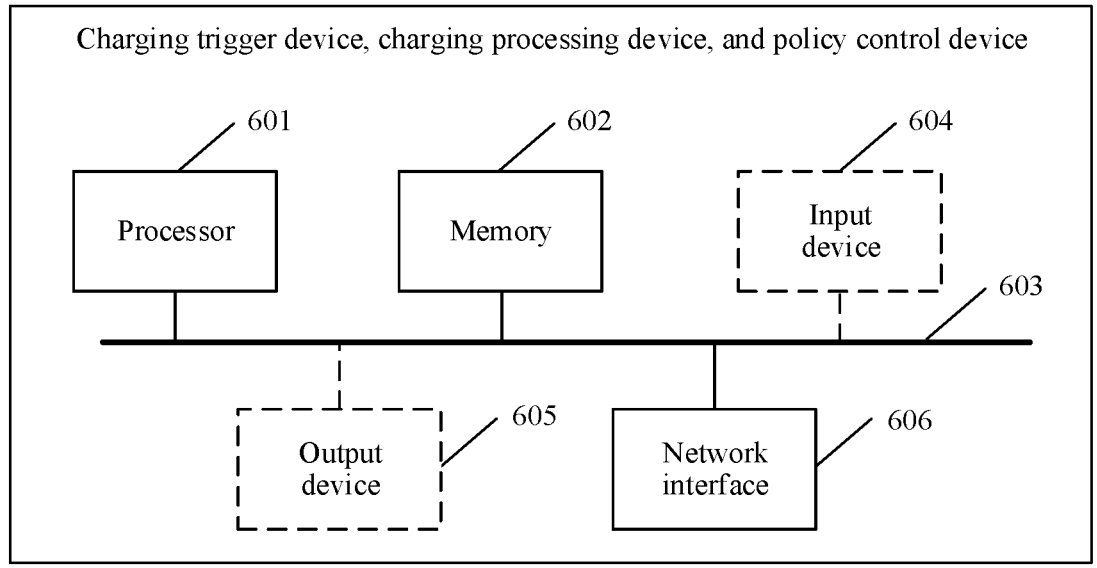
FIG. 6 is a schematic diagram of a hardware structure of a charging trigger device, a charging processing device, or a policy control device according to an embodiment of this application.

FIG. 6 is a diagram of a hardware structure of a charging trigger device, a charging processing device, or a policy control device according to an embodiment of this application. All charging trigger devices (for example, 102 in FIG. 1), charging processing devices (for example, 101 in FIG. 1), and policy control devices (for example, the policy control device 104 in FIG. 1) in embodiments of this application may be all implemented by using a general-purpose computer hardware structure shown in FIG. 6. The structure includes a processor 601, a memory 602, a bus 603, an input device 604, an output device 605, and a network interface 606. The input device 604 and the output device 605 are optional.

Specifically, the memory 602 may include a computer storage medium in a form of a volatile and/or non-volatile memory, for example, a read-only memory and/or a random access memory. The memory 602 may store an operating system, an application program, another program module, executable code, and program data.

The input device 604 may be configured to input information, so that a system administrator operates and manages the charging trigger device, the charging processing device, or the policy control device. For example, a user account risk threshold is configured on the charging processing device, storage space for initial quota request mode indication information is managed on the charging trigger device, and storage space for initial quota request mode indication information is managed on the policy control device. The input device 604 may be a keyboard or a pointing device, for example, a mouse, a trackball, a touchpad, a microphone, a joystick, a game pad, a satellite television antenna, a scanner, or a similar device. The input device may be connected to the processor 601 by using the bus 603.

The output device 605 may be configured to output information, so that the system administrator operates and manages the charging trigger device, the charging processing device, or the policy control device. For example, the user account risk threshold is displayed on the charging processing device, remaining storage space is displayed on the charging trigger device, and remaining storage space is displayed on the policy control device. In addition to a monitor, the output device 605 may be another peripheral output device, for example, a speaker and/or a print device; or may be connected to the processor 601 by using the bus 603.

The charging trigger device, the charging processing device, or the policy control device may be all connected to a network by using the network interface 606, for example, connected to a local area network (LAN). In a network connection environment, computer execution instructions stored in the charging trigger device, the charging processing device, or the policy control device may be stored in a remote storage device, and may be not limited to be locally stored.

When the processor 601 in the charging trigger device executes the executable code or the application program stored in the memory 602, the charging trigger device may execute method steps corresponding to the charging trigger device in all the foregoing embodiments, for example, steps 230, 303, 307-2, 331-2, 346, 370, 410, 449, 507-2, and 556-2. For a specific execution process, refer to the foregoing embodiments. Details are not described herein again.

When the processor 601 in the charging processing device executes the executable code or the application program stored in the memory 602, the charging processing device may execute method steps corresponding to the charging processing device in all the foregoing embodiments, for example, steps 220, 305-1, 329-1, 344, 368, 408, 447, 505-2, and 554-2. For a specific execution process, refer to the foregoing embodiments. Details are not described herein again.

When the processor 601 in the policy control device executes the executable code or the application program stored in the memory 602, the policy control device may execute method steps corresponding to the policy control device in all the foregoing embodiments, for example, steps 502-2, 509-2, 552-2, and 558-2. For a specific execution process, refer to the foregoing embodiments. Details are not described herein again.

Figure 7:
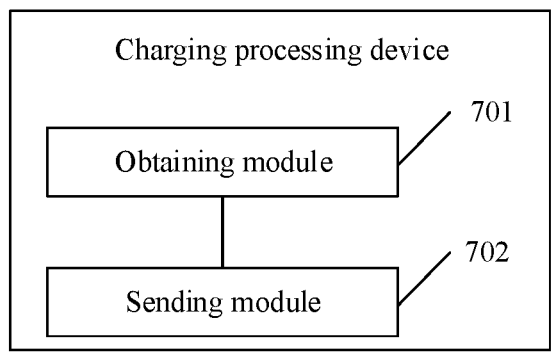
FIG. 7 is a schematic diagram of a logical structure of a charging processing device according to an embodiment of this application.

FIG. 7 is a schematic diagram of a logical structure of the charging processing device (101) according to an embodiment of this application. The charging processing device (101) is configured to control, based on an initial quota request mode applied by the charging trigger device (102) for a user service, a charging operation performed by the charging trigger device (102) on the user service. The charging processing device includes an obtaining module 701 and a sending module 702.

The obtaining module 701 is configured to obtain initial quota request mode indication information of a user service and the like. The initial quota request mode indication information indicates that the charging trigger device (102) applies a first initial quota request mode for the user service when receiving a first start request of the user service. For a specific execution process, refer to the foregoing descriptions of steps on the charging processing device side in the foregoing embodiments, for example, steps 201, 304, 324, and 328-1.

The sending module 702 is configured to send a charging processing result and the like to the charging trigger device (102). The charging processing result is a result obtained by performing charging processing on the user service based on the initial quota request mode indication information. For a specific execution process, refer to the foregoing descriptions of steps on the charging processing device side in the foregoing embodiments, for example, steps 330-1, 330-2, and 345.

Figure 8:
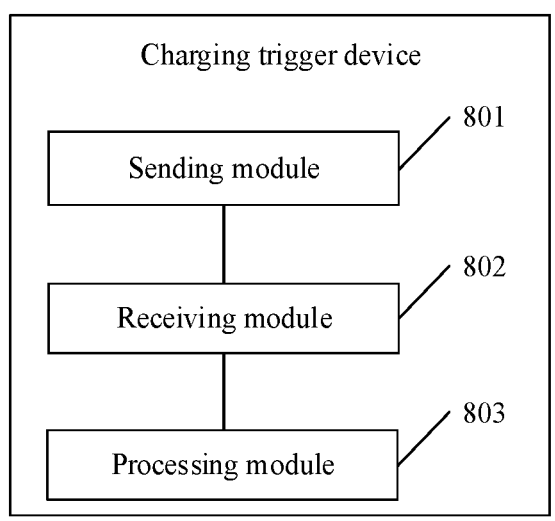
FIG. 8 is a schematic diagram of a logical structure of a charging trigger device according to an embodiment of this application.

FIG. 8 is a schematic diagram of a logical structure of the charging trigger device (102) according to an embodiment of this application. The charging trigger device (102) is configured to: send initial quota request mode indication information of a user service to the charging processing device (101), and adjust a charging operation on the user service based on a charging processing result sent by the charging processing device (101). The charging trigger device (102) includes a sending module 801, a receiving module 802, and a processing module 803.

The sending module 801 is configured to send initial quota request mode indication information of a user service and the like to the charging processing device (101). The initial quota request mode indication information indicates that the charging trigger device (102) applies a first initial quota request mode for the user service when receiving a first start request of the user service. For a specific execution process, refer to the foregoing descriptions of steps on the charging trigger device side in the foregoing embodiments, for example, steps 201, 304, 324, and 328-1.

The receiving module 802 is configured to receive a charging processing result of the user service and the like from the charging processing device (101). For a specific execution process, refer to the foregoing descriptions of steps on the charging trigger device side in the foregoing embodiments, for example, steps 330-1, 330-2, and 345.

The processing module 803 is configured to process the user service based on the charging processing result, and the like. For a specific execution process, refer to the foregoing descriptions of steps on the charging trigger device side in the foregoing embodiments, for example, steps 307-1, 307-2, 307-3, 331-1, 331-2, 331-3, and 331-4.

Figure 9:
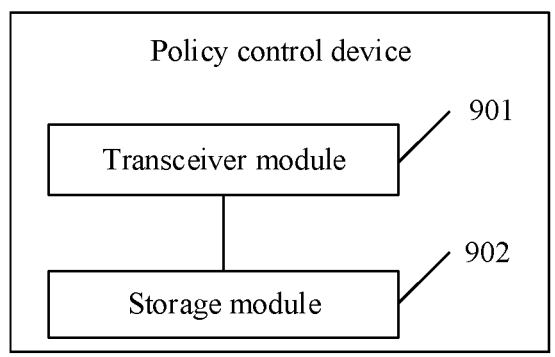
FIG. 9 is a schematic diagram of a logical structure of a policy control device according to an embodiment of this application.

FIG. 9 is a schematic diagram of a logical structure of the policy control device (104) according to an embodiment of this application. The policy control device (104) is configured to store an initial quota request mode for a user service for the charging trigger device (102). The policy control device (104) includes a transceiver module 901 and a storage module 902.

The transceiver module 901 is configured to receive an initial quota request mode for a user service from the charging trigger device (102), or receive a query request of an initial quota request mode from the charging trigger device (102), or the like. For a specific execution process, refer to the foregoing descriptions of steps on the charging trigger device side in the foregoing embodiments, for example, steps 502-2-1 and 509-2-1.

The storage module 902 is configured to: receive the initial quota request mode that is of the user service and that is received from the charging trigger device (102), and store the initial quota request mode for the user service into a local storage device. Optionally, the transceiver module 901 returns a success response to the charging trigger device (102), or finds the initial quota request mode for the user service from local storage settings based on a query request that is of the initial quota request mode and that is received from the charging trigger device (102), and sends the initial quota request mode for the user service to the charging trigger device (102) by using the transceiver module 901, for example, steps 502-2-2 and 509-2-2.

The charging processing device shown in FIG. 7, the charging trigger device shown in FIG. 8, and the policy control device shown in FIG. 9 are presented in a form of a function module. The "module" herein may be an application-specific integrated circuit (ASIC), a circuit, a processor that execute one or more software programs or firmware programs, a memory, an integrated logic circuit, and/or another component that can provide the foregoing function. In a simple embodiment, a person skilled in the art may figure out that the device may be in the form shown in FIG. 6. For example, the obtaining module 701, the sending module 702, the sending module 801, the receiving module 802, the processing module 803, the transceiver module 901, and the storage module 902 may all be implemented by using the processor 601 and the memory 602 in FIG. 6. For example, a function of the obtaining module 701 in obtaining the initial quota request mode indication information of the user service, a function of the sending module 801 in sending the initial quota request mode indication information, and a function of the storage module 902 in storing the initial quota request mode for the user service may be all implemented by the processor 601 through executing code stored in the memory 602.

A person of ordinary skill in the art may be aware that, in combination with the examples described in embodiments disclosed in this specification, units and algorithm steps can be implemented by electronic hardware, computer software, or a combination thereof. To clearly describe interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it cannot be considered that the implementation goes beyond the scope of this application.

It may be clearly understood by a person of ordinary skill in the art that, for ease and brief description, for a detailed working process of the foregoing system, apparatuses, and units, refer to a corresponding process in the foregoing method embodiments. Details are not described herein again.

In several embodiments provided in this application, it can be understood that the disclosed systems, apparatuses, and methods may be implemented in another manner. For example, division into the units is merely logical function division and may be another division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

Units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments of this application.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to a conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, for example, a USB flash drive, a removable hard disk, a read-only memory, a random access memory, a magnetic disk, or an optical disc.

The foregoing descriptions are merely specific implementations of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A user service processing method executed by a charging processing device, the method comprising:
obtaining initial quota request mode indication information of a user service, wherein the initial quota request mode indication information indicates that a charging trigger device applies a first initial quota request mode for the user service when receiving a first start request of the user service; and
sending a charging processing result to the charging trigger device, wherein the charging processing result is a result of performing charging processing on the user service based on the initial quota request mode indication information,
wherein the charging processing result comprises at least one of:
an indication parameter indicating the charging trigger device to suspend quota management for the user service; or
an indication parameter indicating the charging trigger device to terminate the user service,
wherein, based on the first initial quota request mode being a non-blocking mode, the charging processing result comprises the indication parameter indicating the charging trigger device to suspend the quota management for the user service, and
wherein the performing charging processing on the user service based on the initial quota request mode indication information comprises failing in granting a quota for the user service, and determining, based on the initial quota request mode indication information, that the charging trigger device is to suspend the quota management for the user service.

2. The method according to claim 1, wherein the obtaining initial quota request mode indication information comprises:
receiving an initial charging request message of the user service from the charging trigger device, wherein the initial charging request message comprises the initial quota request mode indication information; and obtaining the initial quota request mode indication information from the initial charging request message.

3. The method according to claim 1, wherein based on the first initial quota request mode being a non-blocking mode, the charging processing result further comprises the indication parameter indicating the charging trigger device to terminate the user service, and
wherein the performing charging processing on the user service based on the initial quota request mode indication information further comprises:
determining, based on the initial quota request mode indication information, that the charging trigger device is to terminate the user service.

4. The method according to claim 3, further comprising:
receiving a non-quota usage amount of the user service from the charging trigger device.

5. The method according to claim 1, wherein the charging processing result further comprises an indication parameter indicating the charging trigger device to apply a second initial quota request mode for the user service when receiving a second start request of the user service, and the second start request is later than the first start request.

6. The method according to claim 5, wherein the first initial quota request mode is a non-blocking mode, and the second initial quota request mode is a blocking mode; or
wherein the first initial quota request mode is a blocking mode, and the second initial quota request mode is a non-blocking mode.

7. The method according to claim 1, wherein:
the performing charging processing on the user service based on the initial quota request mode indication information is triggered by the initial charging request message of the user service, and the sending a charging processing result to the charging trigger device comprises sending an initial charging response message of the user service to the charging trigger device, wherein the initial charging response message comprises the charging processing result;
the performing charging processing on the user service based on the initial quota request mode indication information is triggered by an interim charging request message of the user service, and the sending a charging processing result to the charging trigger device comprises sending an interim charging response message of the user service to the charging trigger device, wherein the interim charging response message comprises the charging processing result; or
the performing charging processing on the user service based on the initial quota request mode indication information is triggered by another charging request message or an account management message, wherein the another charging request message is a charging request message of another user service, the another user service corresponds to an identical account as the user service, and the account management message is a management message of the account corresponding to the user service; and
the sending a charging processing result to the charging trigger device comprises sending a notification message to the charging trigger device, wherein the notification message comprises the charging processing result.

8. A user service processing method, executed by a charging trigger device, the user service processing method comprising:

sending initial quota request mode indication information of a user service to a charging processing device, wherein the initial quota request mode indication information indicates that the charging trigger device applies a first initial quota request mode for the user service when receiving a first start request of the user service;
receiving a charging processing result of the user service from the charging processing device; and
processing the user service based on the charging processing result,
wherein the charging processing result comprises an indication parameter indicating the charging trigger device to apply a second initial quota request mode for the user service when receiving a second start request of the user service, the second start request being later than the first start request,
wherein the processing the user service based on the charging processing result comprises updating an initial quota request mode for the user service to the second initial quota request mode, and wherein the first initial quota request mode is a non-blocking mode and the second initial quota request mode is a blocking mode, or the first initial quota request mode is a blocking mode and the second initial quota request mode is a non-blocking mode.

9. The method according to claim 8, wherein the sending initial quota request mode indication information of a user service to a charging processing device is specifically as follows:
when the first start request is received, applying the first initial quota request mode for the user service; and
sending an initial charging request message of the user service to the charging processing device, wherein the initial charging request message comprises the initial quota request mode indication information.

10. The method according to claim 8, wherein the charging processing result comprises at least one of:
an indication parameter indicating the charging trigger device to suspend quota management for the user service; or an indication parameter indicating the charging trigger device to terminate the user service.

11. The method according to claim 10, wherein the charging processing result comprises the indication parameter indicating the charging trigger device to suspend quota management for the user service, and the processing the user service based on the charging processing result comprises:
suspending the quota management for the user service.

12. The method according to claim 10, wherein the charging processing result comprises the indication parameter indicating the charging trigger device to terminate the user service, and the processing the user service based on the charging processing result comprises:
terminating the user service, and sending a non-quota usage amount of the user service to the charging processing device.

13. The method according to claim 8, wherein the receiving a charging processing result of the user service from the charging processing device comprises:
receiving an initial charging response message of the user service from the charging processing device, wherein the initial charging response message comprises the charging processing result;
receiving an interim charging response message of the user service from the charging processing device, wherein the interim charging response message comprises the charging processing result; or receiving a notification message from the charging processing device, wherein the notification message comprises the charging processing result.

14. The method according to claim 8, wherein the processing the user service based on the charging processing result comprises:

determining, based on the charging processing result, to apply a second initial quota request mode for the user service when receiving a second start request of the user service, wherein the second start request is later than the first start request; and updating an initial quota request mode for the user service to the second initial quota request mode.

15. The method according to claim 8, wherein the updating an initial quota request mode for the user service to the second initial quota request mode comprises:

sending, to a policy control device, indication information for disabling the first initial quota request mode to be applied for the user service; or sending, to a policy control device, indication information for changing the initial quota request mode corresponding to the user service to the second initial quota request mode.

16. A user service processing method, comprising:

sending, a charging trigger device, initial quota request mode indication information of a user service to a charging processing device, wherein the initial quota request mode indication information indicates that the charging trigger device applies a first initial quota request mode for the user service when receiving a first start request of the user service;

obtaining, by the charging processing device, the initial quota request mode indication information;

sending, by the charging processing device, a charging processing result to the charging trigger device, wherein the charging processing result is a result of performing charging processing on the user service based on the initial quota request mode indication information; and receiving, by the charging trigger device, the charging processing result from the charging processing device; and processing, by the charging trigger device, the user service based on the charging processing result, wherein the charging processing result comprises at least one of:

an indication parameter indicating the charging trigger device to suspend quota management for the user service; or an indication parameter indicating the charging trigger device to terminate the user service, wherein, based on the first initial quota request mode being a non-blocking mode, the charging processing result comprises the indication parameter indicating the charging trigger device to suspend the quota management for the user service, and where in the processing the user service based on the charging processing result comprises failing in ranting a quota for the user service, and determining, based on the initial quota request mode indication information, that the charging trigger device is to suspend the quota management for the user service.

* * * * *